(12) United States Patent
Grendel et al.

(10) Patent No.: US 8,423,428 B2
(45) Date of Patent: Apr. 16, 2013

(54) METHOD FOR ALLOCATION OF BUDGET TO ORDER PERIODS AND DELIVERY PERIODS IN A PURCHASE ORDER SYSTEM

(75) Inventors: Alexander Grendel, Bad Schönborn (DE); Markus Welter, Ottweiler (DE)

(73) Assignee: SAP AG, Walldord (DE)

( * ) Notice: Subject to any disclaimer, the term of this patent is extended or adjusted under 35 U.S.C. 154(b) by 1388 days.

(21) Appl. No.: 10/915,263

(22) Filed: Aug. 10, 2004

(65) Prior Publication Data
US 2005/0197913 A1 Sep. 8, 2005

Related U.S. Application Data

(60) Provisional application No. 60/551,221, filed on Mar. 8, 2004, provisional application No. 60/563,284, filed on Apr. 16, 2004.

(51) Int. Cl.
*G06Q 30/00* (2006.01)
(52) U.S. Cl.
USPC ...................................................... 705/26.81
(58) Field of Classification Search ............ 705/26–27.2
See application file for complete search history.

(56) References Cited

U.S. PATENT DOCUMENTS

| | | | |
|---|---|---|---|
| 4,750,119 A | 6/1988 | Cohen et al. | |
| 4,752,877 A | 6/1988 | Roberts et al. | |
| 5,297,250 A | 3/1994 | Leroy et al. | |
| 5,313,392 A | 5/1994 | Temma et al. | |
| 5,315,508 A | 5/1994 | Bain et al. | |
| 5,325,304 A | 6/1994 | Aoki | |
| 5,400,253 A | 3/1995 | O'Connor | |
| 5,500,513 A | 3/1996 | Langhans et al. | |
| 5,615,109 A | 3/1997 | Eder | |
| 5,621,201 A | 4/1997 | Langhans et al. | |
| 5,710,578 A | 1/1998 | Beauregard et al. | |
| 5,758,327 A | 5/1998 | Gardner et al. | |
| 5,796,614 A | 8/1998 | Yamada | |
| 5,832,496 A | 11/1998 | Anand et al. | |
| 5,870,716 A | 2/1999 | Sugiyama et al. | |
| 5,878,400 A | 3/1999 | Carter, III | |
| 5,920,846 A | 7/1999 | Storch et al. | |
| 5,930,769 A | 7/1999 | Rose | |

(Continued)

FOREIGN PATENT DOCUMENTS

| | | |
|---|---|---|
| JP | 2004-030343 A | 1/2004 |
| WO | WO 99/45450 A2 | 9/1999 |
| WO | WO 01/71635 A2 | 9/2001 |
| WO | WO 0171635 A2 * | 9/2001 |

OTHER PUBLICATIONS

U.S. Appl. No. 60/374,892, filed Apr. 22, 2002, Krajec.

(Continued)

*Primary Examiner* — Adam Levine
(74) *Attorney, Agent, or Firm* — Foley & Lardner LLP

(57) ABSTRACT

A method of processing a purchase order is disclosed. The method includes receiving an electronic purchase order in a current one of a plurality of order periods for a designated delivery period, accessing a budget allocation corresponding to said delivery period, and providing an acceptance or a rejection of the electronic purchase order based at least partially on a budget portion of the current order period. The budget allocation includes a budget portion corresponding to each of the plurality of order periods.

30 Claims, 13 Drawing Sheets

U.S. PATENT DOCUMENTS

| | | |
|---|---|---|
| 5,930,771 A | 7/1999 | Stapp |
| 5,943,652 A | 8/1999 | Sisley et al. |
| 5,953,707 A | 9/1999 | Huang et al. |
| 5,999,914 A | 12/1999 | Blinn et al. |
| 6,014,648 A | 1/2000 | Brennan |
| 6,029,139 A | 2/2000 | Cunningham et al. |
| 6,064,984 A | 5/2000 | Ferguson et al. |
| 6,115,690 A | 9/2000 | Wong |
| 6,151,588 A | 11/2000 | Tozzoli et al. |
| 6,185,550 B1 | 2/2001 | Snow et al. |
| 6,260,024 B1 | 7/2001 | Shkedy |
| 6,260,241 B1 | 7/2001 | Brennan |
| 6,285,916 B1 | 9/2001 | Kadaba et al. |
| 6,341,351 B1 | 1/2002 | Muralidhran et al. |
| 6,366,890 B1 | 4/2002 | Usrey |
| 6,473,794 B1 | 10/2002 | Guheen et al. |
| 6,484,149 B1 | 11/2002 | Jammes et al. |
| 6,505,093 B1 | 1/2003 | Thatcher et al. |
| 6,507,851 B1 | 1/2003 | Fujiwara et al. |
| 6,647,380 B1 | 11/2003 | Yotsukura |
| 6,671,676 B1 | 12/2003 | Shacham |
| 6,701,299 B2 | 3/2004 | Kraisser et al. |
| 6,721,715 B2 | 4/2004 | Nemzow |
| 6,725,204 B1 | 4/2004 | Gusley |
| 6,868,528 B2 | 3/2005 | Roberts |
| 6,910,017 B1 | 6/2005 | Woo et al. |
| 6,980,966 B1 | 12/2005 | Sobrado et al. |
| 7,016,859 B2 | 3/2006 | Whitesage |
| 7,080,030 B2 | 7/2006 | Eglen et al. |
| 7,082,408 B1 | 7/2006 | Baumann et al. |
| 7,082,426 B2 | 7/2006 | Musgrove et al. |
| 7,092,929 B1 | 8/2006 | Dvorak et al. |
| 7,096,189 B1 | 8/2006 | Srinivasan |
| 7,107,268 B1 | 9/2006 | Zawadzki et al. |
| 7,117,165 B1 | 10/2006 | Adam et al. |
| 7,124,098 B2 | 10/2006 | Hopson et al. |
| 7,124,984 B2 | 10/2006 | Yokouchi et al. |
| 7,139,731 B1 | 11/2006 | Alvin |
| 7,188,080 B1 | 3/2007 | Walker et al. |
| 7,216,086 B1 | 5/2007 | Grosvenor et al. |
| 7,283,975 B2 | 10/2007 | Broughton |
| 7,343,315 B2 | 3/2008 | Wittmer et al. |
| 7,346,656 B2 | 3/2008 | Worthen |
| 7,499,877 B2 | 3/2009 | Carr et al. |
| 7,516,083 B2 | 4/2009 | Dvorak et al. |
| 7,523,048 B1 | 4/2009 | Dvorak |
| 7,574,383 B1 | 8/2009 | Parasnis et al. |
| 7,647,250 B2 | 1/2010 | Abo-Hasna et al. |
| 7,660,742 B2 | 2/2010 | Biwer et al. |
| 7,693,749 B2 | 4/2010 | Wittmer et al. |
| 7,742,948 B2 | 6/2010 | Welter et al. |
| 7,805,335 B2 | 9/2010 | Wittmer et al. |
| 7,813,949 B2 | 10/2010 | Grendel et al. |
| 7,831,487 B2 | 11/2010 | Abo-Hasna et al. |
| 7,853,491 B2 | 12/2010 | Wittmer et al. |
| 2001/0011295 A1 | 8/2001 | Kobayashi et al. |
| 2001/0013731 A1 | 8/2001 | Shinohara et al. |
| 2001/0019332 A1 | 9/2001 | Fisher |
| 2001/0019778 A1 | 9/2001 | Gardaz et al. |
| 2001/0032130 A1 | 10/2001 | Gabos et al. |
| 2001/0034673 A1 | 10/2001 | Yang et al. |
| 2001/0039517 A1 | 11/2001 | Kawakatsu |
| 2001/0049634 A1 | 12/2001 | Stewart |
| 2002/0012390 A1 | 1/2002 | Kim |
| 2002/0013731 A1 | 1/2002 | Bright et al. |
| 2002/0019778 A1 | 2/2002 | Isaacson et al. |
| 2002/0023500 A1 | 2/2002 | Chikuan et al. |
| 2002/0026368 A1 | 2/2002 | Carter, III |
| 2002/0048369 A1 | 4/2002 | Ginter et al. |
| 2002/0059108 A1 | 5/2002 | Okura et al. |
| 2002/0059122 A1 | 5/2002 | Inoue et al. |
| 2002/0062314 A1 | 5/2002 | Hisasue et al. |
| 2002/0072986 A1 | 6/2002 | Aram |
| 2002/0073114 A1 | 6/2002 | Nicastro et al. |
| 2002/0078159 A1 | 6/2002 | Petrogiannis et al. |
| 2002/0099563 A1 | 7/2002 | Adendorff et al. |
| 2002/0099579 A1 | 7/2002 | Stowell et al. |
| 2002/0107713 A1 | 8/2002 | Hawkins |
| 2002/0111892 A1 | 8/2002 | Sharp et al. |
| 2002/0116241 A1 | 8/2002 | Sandhu et al. |
| 2002/0120523 A1 | 8/2002 | Yang |
| 2002/0120533 A1 | 8/2002 | Wiesenmaier |
| 2002/0123930 A1 | 9/2002 | Boyd et al. |
| 2002/0128946 A1 | 9/2002 | Chehade et al. |
| 2002/0138290 A1 | 9/2002 | Metcalfe et al. |
| 2002/0138360 A1 | 9/2002 | Inoue et al. |
| 2002/0143644 A1 | 10/2002 | Tosun et al. |
| 2002/0143690 A1 | 10/2002 | Mahajan et al. |
| 2002/0147622 A1 | 10/2002 | Drolet et al. |
| 2002/0147668 A1 | 10/2002 | Smith et al. |
| 2002/0152128 A1 | 10/2002 | Walch et al. |
| 2002/0156858 A1 | 10/2002 | Hunter |
| 2002/0165782 A1 | 11/2002 | Falkenstein et al. |
| 2002/0184116 A1 | 12/2002 | Tam et al. |
| 2002/0188499 A1 | 12/2002 | Jenkins et al. |
| 2002/0188524 A1 | 12/2002 | Shimizu |
| 2003/0023500 A1 | 1/2003 | Boies et al. |
| 2003/0028393 A1 | 2/2003 | Coulston et al. |
| 2003/0028437 A1 | 2/2003 | Grant et al. |
| 2003/0033231 A1 | 2/2003 | Turner et al. |
| 2003/0046120 A1 | 3/2003 | Hoffman et al. |
| 2003/0046195 A1* | 3/2003 | Mao ............................. 705/30 |
| 2003/0050852 A1 | 3/2003 | Liao et al. |
| 2003/0065574 A1 | 4/2003 | Lawrence |
| 2003/0074269 A1 | 4/2003 | Viswanath |
| 2003/0083961 A1 | 5/2003 | Bezos et al. |
| 2003/0120528 A1 | 6/2003 | Kruk et al. |
| 2003/0126024 A1 | 7/2003 | Crampton et al. |
| 2003/0128392 A1 | 7/2003 | O'Brien et al. |
| 2003/0144916 A1 | 7/2003 | Mumm et al. |
| 2003/0149578 A1 | 8/2003 | Wong |
| 2003/0149631 A1 | 8/2003 | Crampton et al. |
| 2003/0149674 A1 | 8/2003 | Good et al. |
| 2003/0158791 A1 | 8/2003 | Gilberto et al. |
| 2003/0171998 A1* | 9/2003 | Pujar et al. ...................... 705/26 |
| 2003/0172007 A1 | 9/2003 | Helmott et al. |
| 2003/0187767 A1 | 10/2003 | Crites et al. |
| 2003/0200150 A1 | 10/2003 | Westcott et al. |
| 2003/0200156 A1 | 10/2003 | Roseman et al. |
| 2003/0200168 A1 | 10/2003 | Cullen, III et al. |
| 2003/0208365 A1 | 11/2003 | Avery et al. |
| 2003/0217024 A1 | 11/2003 | Kocher |
| 2003/0229502 A1 | 12/2003 | Woo |
| 2003/0236721 A1 | 12/2003 | Plumer et al. |
| 2004/0006522 A1 | 1/2004 | Keane et al. |
| 2004/0010463 A1 | 1/2004 | Hahn-Carlson et al. |
| 2004/0015367 A1 | 1/2004 | Nicastro et al. |
| 2004/0019528 A1 | 1/2004 | Broussard et al. |
| 2004/0098358 A1 | 5/2004 | Roediger |
| 2004/0122689 A1 | 6/2004 | Dailey et al. |
| 2004/0158507 A1 | 8/2004 | Meek, Jr. et al. |
| 2004/0162763 A1 | 8/2004 | Hoskin et al. |
| 2004/0172321 A1 | 9/2004 | Vemula et al. |
| 2004/0186763 A1 | 9/2004 | Smith |
| 2004/0186765 A1* | 9/2004 | Kataoka ........................ 705/10 |
| 2004/0186783 A1 | 9/2004 | Knight et al. |
| 2004/0210489 A1 | 10/2004 | Jackson et al. |
| 2004/0220861 A1 | 11/2004 | Morciniec et al. |
| 2004/0249722 A1 | 12/2004 | Sugamura et al. |
| 2004/0267674 A1 | 12/2004 | Feng et al. |
| 2005/0015303 A1 | 1/2005 | Dubin et al. |
| 2005/0055283 A1 | 3/2005 | Zarovinsky |
| 2005/0060270 A1 | 3/2005 | Ramakrishnan |
| 2005/0075915 A1 | 4/2005 | Clarkson |
| 2005/0075941 A1 | 4/2005 | Jetter et al. |
| 2005/0086122 A1 | 4/2005 | Cirulli et al. |
| 2005/0086125 A1 | 4/2005 | Cirulli et al. |
| 2005/0096122 A1 | 5/2005 | Nireki et al. |
| 2005/0096125 A1 | 5/2005 | LeMay et al. |
| 2005/0096963 A1 | 5/2005 | Myr et al. |
| 2005/0102175 A1 | 5/2005 | Dudat et al. |
| 2005/0102192 A1 | 5/2005 | Gerrits et al. |
| 2005/0102227 A1 | 5/2005 | Solonchev |
| 2005/0131807 A1 | 6/2005 | Schaefer et al. |
| 2005/0165659 A1 | 7/2005 | Gruber |
| 2005/0171825 A1 | 8/2005 | Denton et al. |
| 2005/0197912 A1 | 9/2005 | Wittmer et al. |

| | | | |
|---|---|---|---|
| 2005/0197913 A1 | 9/2005 | Grendel et al. |
| 2005/0197914 A1 | 9/2005 | Welter et al. |
| 2005/0197915 A1 | 9/2005 | Biwer et al. |
| 2005/0197918 A1 | 9/2005 | Wittmer et al. |
| 2005/0197921 A1 | 9/2005 | Abo-Hasna et al. |
| 2005/0197949 A1 | 9/2005 | Welter et al. |
| 2005/0203813 A1 | 9/2005 | Welter et al. |
| 2005/0216325 A1 | 9/2005 | Ziad et al. |
| 2005/0216357 A1 | 9/2005 | Wittmer et al. |
| 2005/0216359 A1 | 9/2005 | Welter et al. |
| 2005/0216375 A1 | 9/2005 | Grendel et al. |
| 2005/0235020 A1 | 10/2005 | Gabelmann et al. |
| 2005/0240488 A1 | 10/2005 | Grendel et al. |
| 2005/0243792 A1 | 11/2005 | Simon et al. |
| 2005/0246482 A1 | 11/2005 | Gabelmann et al. |
| 2005/0251734 A1 | 11/2005 | Gabelmann et al. |
| 2006/0015417 A1 | 1/2006 | Wittmer et al. |
| 2006/0020512 A1 | 1/2006 | Lucas et al. |
| 2006/0036507 A1 | 2/2006 | Pujar et al. |
| 2006/0074746 A1 | 4/2006 | Kline et al. |
| 2006/0074747 A1 | 4/2006 | Kline et al. |
| 2006/0074748 A1 | 4/2006 | Kline et al. |
| 2006/0074749 A1 | 4/2006 | Kline et al. |
| 2006/0074751 A1 | 4/2006 | Kline et al. |
| 2006/0112099 A1 | 5/2006 | Musgrove et al. |
| 2006/0184401 A1 | 8/2006 | DelGaudio et al. |
| 2007/0050272 A1 | 3/2007 | Godlewski et al. |
| 2010/0049582 A1 | 2/2010 | Abo-Hasna et al. |
| 2010/0100455 A1 | 4/2010 | Song |

OTHER PUBLICATIONS

Abraham et al., "An Implemented System for Improving Promotion Productivity Using Store Scanner Data", Marketing Science, Summer 1993, vol. 12, No. 3, pp. 248-269.

Anon., "(A Lot of) Life After H. Ross: Electronic Data Systems", *Financial World*, vol. 162, No. 22, Nov. 9, 1993 (p. 50(2)).

"Beyond Markdown Management", summer/autumn 03, the 4caster, Issue 4, vol. 2, 4 pages.

Brown, "The Effects of Assortment Composition Flexibility on Operating Efficiency", (Abstract Only), *Dissertation Abstracts Int'l.*, vol. 55/08-A, available at least by 1994, (p. 2458).

"Retailers Manage Markdown Challenges Using i2 Solutions", Jan. 13, 2003, NFR 92nd Annual Convention & Expo, 2 pages.

Author unknown, "Staffware and Biomni Join Forces to Provide End-to-End E-Procurement Solution with Enhanced Workflow Capability: Self-Service Functionality will Enable Thousands of Transactions to be Handled Daily from the Desktop," M2 Presswire, Coventry, Feb. 6, 2001, 1 page.

Jensen et al., "Long-Term Construction Contracts: The Impact of Tamra '88 on Revenue Recognition", *Journal of Construction Education*, Spring 1997, vol. 2, No. 1, pp. 37-53.

Kelkar et al., Price Modeling in Standards for Electronic Product Catalogs Based on XML, 2002, pp. 366-375.

Melcher, "Local tech firm creates retail markdown tool", Mar. 24, 2000, Cincinnati Business Courier, 3 pages.

Profitlogic, available at http://webarchive.org/web/2002060311838/, available at least by Apr. 15, 2005, 22 pages.

Srinivasan et al., Concepts and strategy guidelines for designing value enhancing sales promotions, Journal of Product and Brand Management, vol. 7, No. 5, 1998, pp. 410-420.

Subrahmanyan et al., "Developing optimal pricing and inventory policies for retailers who face uncertain demand", Journal of Retailing, vol. 72, No. 1, Spring, 1996, 15 pages.

Wilson, "Changing the Process of Production", *Industrial Management*, vol. 37, No. 1, Jan./Feb. 1995 (pp. 1-2).

"New Pegasystems Enterprise Application Provides Central Hub for Proactively Managing Operational Exceptions",Business Wire,(recovered from Dialog database), Feb. 3, 2004, 4 pages.

Bartle et al., "A Review of State Procurement and Contracting", Journal of Public Procurement, 2003, vol. 3, Issue 2, pp. 192-214.

Camas, Yuksel, "APS system integration: more challenges [Advanced planned and Schedule]", Materials Management and Distribution, Toronto, Jan. 2001, vol. 46, Iss. 1, 2 pages.

Chen et al., Near-Optimal Pricing and Replenishment Strategies for a Retail/Distribution System, 1D Operations Research, Nov./Dec. 2001, vol. 49, No. 6, pp. 839-853.

Chen et al., "Quantity and Due Date Quoting Available to Promise", Information Systems Frontier, Dec. 2001, vol. 3, No. 4, pp. 477-488.

Der et al., "On-line scheduling of multi-server batch operations.", IIE Transactions, vol. 33, No. 7, Jul. 2001, pp. 569-586, 18 pages.

Goodwin, David R., 1CThe Open-to-Buy System and Accurate Performance Measurement, 1D International Journal of Retail & Distribution Management, Mar./Apr. 1992, vol. 20, Iss. 2, 7 pages.

Notice of Allowance for U.S. Appl. No. 10/903,467, mail date Aug. 11, 2010, 13 pages.

Notice of Allowance for U.S. Appl. No. 10/903,867, mail date Feb. 17, 2010, 6 pages.

Notice of Allowance for U.S. Appl. No. 10/903,867, mail date May 27, 2010, 6 pages.

Notice of Allowance for U.S. Appl. No. 10/914,614, mail date Jan. 25, 2008, 7 pages.

Notice of Allowance for U.S. Appl. No. 10/914,614, mail date Oct. 3, 2007, 9 pages.

Notice of Allowance for U.S. Appl. No. 10/932,913, mail date Nov. 16, 2009, 17 pages.

Notice of Allowance for U.S. Appl. No. 10/932,913, mail date Sep. 30, 2009, 26 pages.

Notice of Allowance for U.S. Appl. No. 10/933,127, mail date Feb. 4, 2010, 11 pages.

Notice of Allowance for U.S. Appl. No. 11/047,368, mail date Feb. 14, 2011, 11 pages.

Notice of Allowance for U.S. Appl. No. 11/071,982, mail date Aug. 10, 2009, 15 pages.

Notice of Allowance for U.S. Appl. No. 11/072,000, mail date Jul. 9, 2010, 12 pages.

Notice of Allowance for U.S. Appl. No. 11/074,368, mail date Mar. 16, 2011, 6 pages.

Notice of Allowance for U.S. Appl. No. 11/075,391, mail date Aug. 31, 2009, 18 pages.

Notice of Allowance for U.S. Appl. No. 11/075,392, mail date Jan. 5, 2011, 11 pages.

Notice of Allowance for U.S. Appl. No. 11/075,393, mail date Jun. 10, 2010, 19 pages.

Office Action for U.S. Appl. No. 10/903,467, mail date Feb. 3, 2010, 16 pages.

Office Action for U.S. Appl. No. 10/903,467, mail date Jan. 26, 2009, 17 pages.

Office Action for U.S. Appl. No. 10/903,467, mail date Jul. 23, 2009, 17 pages.

Office Action for U.S. Appl. No. 10/903,467, mail date Jun. 11, 2008, 15 pages.

Office Action for U.S. Appl. No. 10/903,467, mail date Mar. 27, 2007, 11 pages.

Office Action for U.S. Appl. No. 10/903,867, mail date Aug. 19, 2008, 10 pages.

Office Action for U.S. Appl. No. 10/903,867, mail date Feb. 25, 2008, 9 pages.

Office Action for U.S. Appl. No. 10/903,867, mail date Mar. 16, 2009, 9 pages.

Office Action for U.S. Appl. No. 10/903,867, mail date Oct. 7, 2009, 9 pages.

Office Action for U.S. Appl. No. 10/903,902, mail date Apr. 23, 2008, 9 pages.

Office Action for U.S. App. No. 10/903,902, mail date Aug. 7, 2008, 8 pages.

Office Action for U.S. Appl. No. 10/903,902, mail date Feb. 12, 2009, 2 pages.

Office Action for U.S. Appl. No. 10/903,902, mail date Mar. 22, 2007, 7 pages.

Office Action for U.S. Appl. No. 10/903,902, mail date Sep. 13, 2007, 8 pages.

Office Action for U.S. Appl. No. 10/915,707, mail date Apr. 13, 2009, 6 pages.

Office Action for U.S. Appl. No. 10/915,707, mail date Apr. 21, 2006, 9 pages.

Office Action for U.S. Appl. No. 10/915,707, mail date Aug. 28, 2006, 13 pages.
Office Action for U.S. Appl. No. 10/915,707, mail date Dec. 8, 2008, 5 pages.
Office Action for U.S. Appl. No. 10/915,707, mail date Mar. 16, 2010, 13 pages.
Office Action for U.S. Appl. No. 10/915,707, mail date Mar. 28, 2007, 13 pages.
Office Action for U.S. Appl. No. 10/915,707, mail date May 1, 2008, 14 pages.
Office Action for U.S. Appl. No. 10/915,707, mail date Sep. 14, 2009, 11 pages.
Office Action for U.S. Appl. No. 10/932,913, mail date Apr. 1, 2009, 15 pages.
Office Action for U.S. Appl. No. 10/932,913, mail date Aug. 27, 2007, 14 pages.
Office Action for U.S. Appl. No. 10/932,913, mail date Jan. 23, 2007, 15 pages.
Office Action for U.S. Appl. No. 10/932,913, mail date Mar. 20, 2008, 14 pages.
Office Action for U.S. Appl. No. 10/932,913, mail date Sep. 17, 2008, 14 pages.
Office Action for U.S. Appl. No. 10/933,127, mail date Aug. 3, 2009, 26 pages.
Office Action for U.S. Appl. No. 10/933,127, mail date Jul. 16, 2008, 10 pages.
Office Action for U.S. Appl. No. 10/933,127, mail date Jul. 3, 2007, 5 pages.
Office Action for U.S. Appl. No. 10/933,127, mail date Nov. 28, 2007, 7 pages.
Office Action for U.S. Appl. No. 10/981,384, mail date Apr. 29, 2009, 10 pages.
Office Action for U.S. Appl. No. 10/981,384, mail date Jan. 14, 2011, 22 pages.
Office Action for U.S. Appl. No. 10/981,384, mail date Mar. 14, 2008, 7 pages.
Office Action for U.S. Appl. No. 10/981,384, mail date Nov. 23, 2009, 10 pages.
Office Action for U.S. Appl. No. 10/981,384, mail date Oct. 16, 2008, 7 pages.
Office Action for U.S. Appl. No. 11/047,368, mail date Dec. 20, 2007, 15 pages.
Office Action for U.S. Appl. No. 11/047,368, mail date Jul. 24, 2008, 18 pages.
Office Action for U.S. Appl. No. 11/047,368, mail date Jun. 16, 2010, 12 pages.
Office Action for U.S. Appl. No. 11/047,368, mail date Jun. 26, 2007, 14 pages.
Office Action for U.S. Appl. No. 11/047,368, mail date Mar. 4, 2009, 16 pages.
Office Action for U.S. Appl. No. 11/047,368, mail date Nov. 10, 2009, 14 pages.
Office Action for U.S. Appl. No. 11/047,368, mail date Nov. 24, 2010, 11 pages.
Office Action for U.S. Appl. No. 11/071,982, mail date Feb. 13, 2009, 18 pages.
Office Action for U.S. Appl. No. 11/071,982, mail date Jan. 25, 2008, 19 pages.
Office Action for U.S. Appl. No. 11/071,982, mail date May 29, 2008, 20 pages.
Office Action for U.S. Appl. No. 11/071,982, mail date Nov. 18, 2008, 7 pages.
Office Action for U.S. Appl. No. 11/072,000, mail date Dec. 9, 2008, 10 pages.
Office Action for U.S. Appl. No. 11/072,000, mail date Jul. 17, 2008, 6 pages.
Office Action for U.S. Appl. No. 11/072,000, mail date Jun. 11, 2009, 13 pages.
Office Action for U.S. Appl. No. 11/072,000, mail date Nov. 12, 2009, 9 pages.
Office Action for U.S. Appl. No. 11/074,368, mail date Apr. 14, 2009, 13 pages.
Office Action for U.S. Appl. No. 11/074,368, mail date Aug. 19, 2009, 12 pages.
Office Action for U.S. Appl. No. 11/074,368, mail date Aug. 31, 2010, 12 pages.
Office Action for U.S. Appl. No. 11/074,368, mail date Mar. 26, 2008, 12 pages.
Office Action for U.S. Appl. No. 11/074,368, mail date Mar. 29, 2007, 11 pages.
Office Action for U.S. Appl. No. 11/074,368, mail date Mar. 30, 2010, 13 pages.
Office Action for U.S. Appl. No. 11/074,368, mail date Oct. 6, 2006, 8 pages.
Office Action for U.S. Appl. No. 11/074,600, mail date Feb. 18, 2009, 25 pages.
Office Action for U.S. Appl. No. 11/074,600, mail date Feb. 3, 2010, 29 pages.
Office Action for U.S. Appl. No. 11/074,600, mail date Jul. 16, 2009, 27 pages.
Office Action for U.S. Appl. No. 11/074,600, mail date Nov. 26, 2010, 27 pages.
Office Action for U.S. Appl. No. 11/074,600, mail date Sep. 8, 2008, 13 pages.
Office Action for U.S. Appl. No. 11/075,391, mail date Apr. 8, 2008, 5 pages.
Office Action for U.S. Appl. No. 11/075,391, mail date Dec. 11, 2008, 9 pages.
Office Action for U.S. Appl. No. 11/075,391, mail date May 22, 2009, 9 pages.
Office Action for U.S. Appl. No. 11/075,392, mail date Apr. 8, 2008, 14 pages.
Office Action for U.S. Appl. No. 11/075,392, mail date Aug. 4, 2010, 15 pages.
Office Action for U.S. Appl. No. 11/075,392, mail date Dec. 9, 2009, 13 pages.
Office Action for U.S. Appl. No. 11/075,392, mail date May 12, 2009, 13 pages.
Office Action for U.S. Appl. No. 11/075,392, mail date Nov. 13, 2008, 15 pages.
Office Action for U.S. Appl. No. 11/075,393, mail date Jun. 11, 2009, 26 pages.
Office Action for U.S. Appl. No. 11/075,393, mail date May 28, 2008, 9 pages.
Office Action for U.S. Appl. No. 11/075,393, mail date Nov. 24, 2009, 24 pages.
Office Action for U.S. Appl. No. 12/611,754, mail date Jan. 31, 2011, 15 pages.
Saad et al.; "An Integrated Model for Order Release and Due-Date Demand Management", Journal of Manufacturing Technology Management, 2004, vol. 15, No. 1, 14 pages.
Staib et al., "Purchasing and Supply Chain Management", Air Force Journal of Logistics, Fall 2002, vol. 26, No. 3, 9 pages.
Stander, Bella; "The choices for taking inventory—and control: a menu of possibilities is available to stores that want to install—or upgrade—computer inventory control systems", Publishers Weekly, Mar. 20, 1995, pp. 33(3), vol. 242, No. 12, retrieved via Dialog on Dec. 17, 2010, 10 pages.

* cited by examiner

☐ OPTION 1:  ELIMINATE ORDER

☐ OPTION 2:  MODIFY ORDER — MAXIMUM ORDER SIZE

☐ OPTION 3:  MODIFY BUDGET ALLOCATION — ACCOMMODATE ORDER

☐ OPTION 4:  MODIFY ORDER — MINIMUM ORDER SIZE, ENSURE DELIVERY SCHEDULE

☐ OPTION 5:  MODIFY BUDGET ALLOCATION AND ORDER — MINIMUM ORDER SIZE, ENSURE DELIVERY SCHEDULE

FIG. 10

METHOD FOR ALLOCATION OF BUDGET TO ORDER PERIODS AND DELIVERY PERIODS IN A PURCHASE ORDER SYSTEM

CROSS-REFERENCE TO RELATED PATENT APPLICATIONS

This application claims the benefit of U.S. Provisional Application No. 60/551,221, filed Mar. 8, 2004 and entitled "Inventory Management," and U.S. Provisional Application No. 60/563,284, filed Apr. 16, 2004 and entitled "Inventory Management," both of which are hereby incorporated by reference.

BACKGROUND OF THE INVENTION

The present invention relates generally to the field of systems for and methods of processing purchase orders. More particularly, the present invention relates to systems for and methods of budgeting for purchase orders by allocating to order periods for the purchase orders.

One particular business that processes purchase orders is the retail business. Operations for a business often include purchasing merchandise from a supplier for sale to customers or for use in the processes and products for the business. Generally, purchasing merchandise or supplies from the supplier involves sending a purchase order to the supplier requesting a specific number of items for a specific price. The number of items multiplied by the price of the items provides a total cost associated with the purchase order. Prior to sending the purchase order, the purchase order may need to be approved by an entity, such as a budgeting department. The entity may apply one or more rules, or checks, to the purchase order in determining whether to approve the purchase order. For example, a rule may dictate that the approval is granted or denied based on whether incurring the total cost of the purchase order is acceptable in view of budget constraints. Accordingly, the purchase order is approved or rejected based on budget constraints prior to being sent to the supplier.

A critical aspect of the ordering process is to minimize the adverse affect of binding or tying up of company cash flow by ordering too much inventory too early. In retail selling, budgets are typically determined for each set of delivery periods. Although the budgets may be allocated for each delivery period, such as a quarter or a month, delivery lead times can require that purchase orders be placed in advance of required delivery period. A typical purchase order may include several products, each having a different lead time. Although the purchase order can be placed early enough to satisfy all lead times, this can result in unfortunate substantial burden to the business by binding (tying up) unnecessary amounts of business capital or cash flow by committing funds committed to purchase orders earlier than needed. This is accomplished by the important act of splitting and allocating purchase orders to order periods in time consistent with delivery periods. More details of this important contribution are discussed in the detailed description of the preferred embodiments section of this patent application. The inventor is unaware of any previous purchase order system that could accomplish detailed purchase order splitting and allocating flexibly, automatically and over a large array of products, budgets, order periods and delivery periods. This is not surprising as the situation in one department store situation revealed more than 40,000 individual order period-delivery combinations.

The retail business can require that certain purchase orders be processed in a very short amount of time, while other purchase orders must be placed well in advance of the desired delivery. For example, changes in current trends in the fashion industry may require that inventory be increased on short notice. For certain aspects of the fashion industry, items may be required to be ordered one or more seasons in advance. An advantageous purchase order system must accommodate this variation in lead times of the ordered items without unnecessarily tying up funds.

SUMMARY OF THE INVENTION

One embodiment of the invention relates to a method of budgeting for purchase orders. The method includes defining a purchasing budget for a delivery period and allocating the purchasing budget into two or more buckets. A budget allocation is generated by allocating the buckets to two or more order periods associated with the delivery period.

Another embodiment of the invention relates to a program product for budgeting for purchase orders. The program product includes machine-readable program code for causing, when executed, one or more machines to perform the following method steps: defining a purchasing budget for a delivery period, allocating the purchasing budget into two or more budget portions, and generating a budget allocation by allocating the budget portions to two or more order periods associated with the delivery period.

Another embodiment of the invention relates to a method of processing a purchase order. The method includes receiving an electronic purchase order in a current one of a plurality of order periods for a designated delivery period, accessing a budget allocation corresponding to said delivery period, and providing an acceptance or a rejection of the electronic purchase order based at least partially on a budget portion of the current order period. The budget allocation includes a budget portion corresponding to each of the plurality of order periods.

Another embodiment of the invention relates to a program product for purchase order processing. The program product includes machine-readable program code for causing, when executed, one or more machines to perform the following method steps: receiving an electronic purchase order in a current one of a plurality of order periods for a designated delivery period, accessing a budget allocation corresponding to said delivery period, and providing an acceptance or a rejection of the electronic purchase order based at least partially on a budget portion of the current order period. The budget allocation includes a budget portion corresponding to each of the plurality of order periods.

Other features and advantages of the present invention will become apparent to those skilled in the art from the following detailed description and accompanying drawings. It should be understood, however, that the detailed description and specific examples, while indicating preferred embodiments of the present invention, are given by way of illustration and not limitation. Many modifications and changes within the scope of the present invention may be made without departing from the spirit thereof, and the invention includes all such modifications.

BRIEF DESCRIPTION OF THE DRAWINGS

The exemplary embodiments will hereafter be described with reference to the accompanying drawings, wherein like numerals depict like elements, and:

FIG. 10 illustrates an embodiment of a screen shot showing exemplary options presented to a user.

DETAILED DESCRIPTION OF THE PREFERRED EMBODIMENTS

In the following description, for the purposes of explanation, numerous specific details are set forth in order to provide a thorough understanding of the present invention. It will be evident to one skilled in the art, however, that the exemplary embodiments may be practiced without these specific details. In other instances, structures and device are shown in diagram form in order to facilitate description of the exemplary embodiments.

The disclosed embodiments provide systems and methods for budgeting for purchase orders in a manner resulting in reducing the amount of funds that are tied up. In the disclosed embodiments, the budget rules allow allocation of budget for the purchase order, for a given delivery period among a plurality of order periods. Thus, purchase orders having items with large variations in lead times can be accommodated without tying up, or binding funds, at an early stage. Further, by separating the available budget into budget portions, or buckets, corresponding to order periods, the disclosed system provides the capability of ensuring the availability of budget in the later order periods. In one embodiment, a bucket refers to a budget portion corresponding to a specific delivery period and a specific order period. Thus, in one example, a bucket represents the intersection of a delivery period and an order period in a budget matrix.

In at least one exemplary embodiment illustrated below, a computer system is described which has a central processing unit (CPU) that executes sequences of instructions contained in a memory. More specifically, execution of the sequences of instructions causes the CPU to perform steps, which are described below. The instructions may be loaded into a random access memory (RAM) for execution by the CPU from a read-only memory (ROM), a mass storage device, or some other persistent storage. In other embodiments, multiple workstations, databases, process, or computers can be utilized. In yet other embodiments, hardwired circuitry may be used in place of, or in combination with, software instructions to implement the functions described. Thus, the embodiments described herein are not limited to any particular source for the instructions executed by the computer system.

Figure 1:
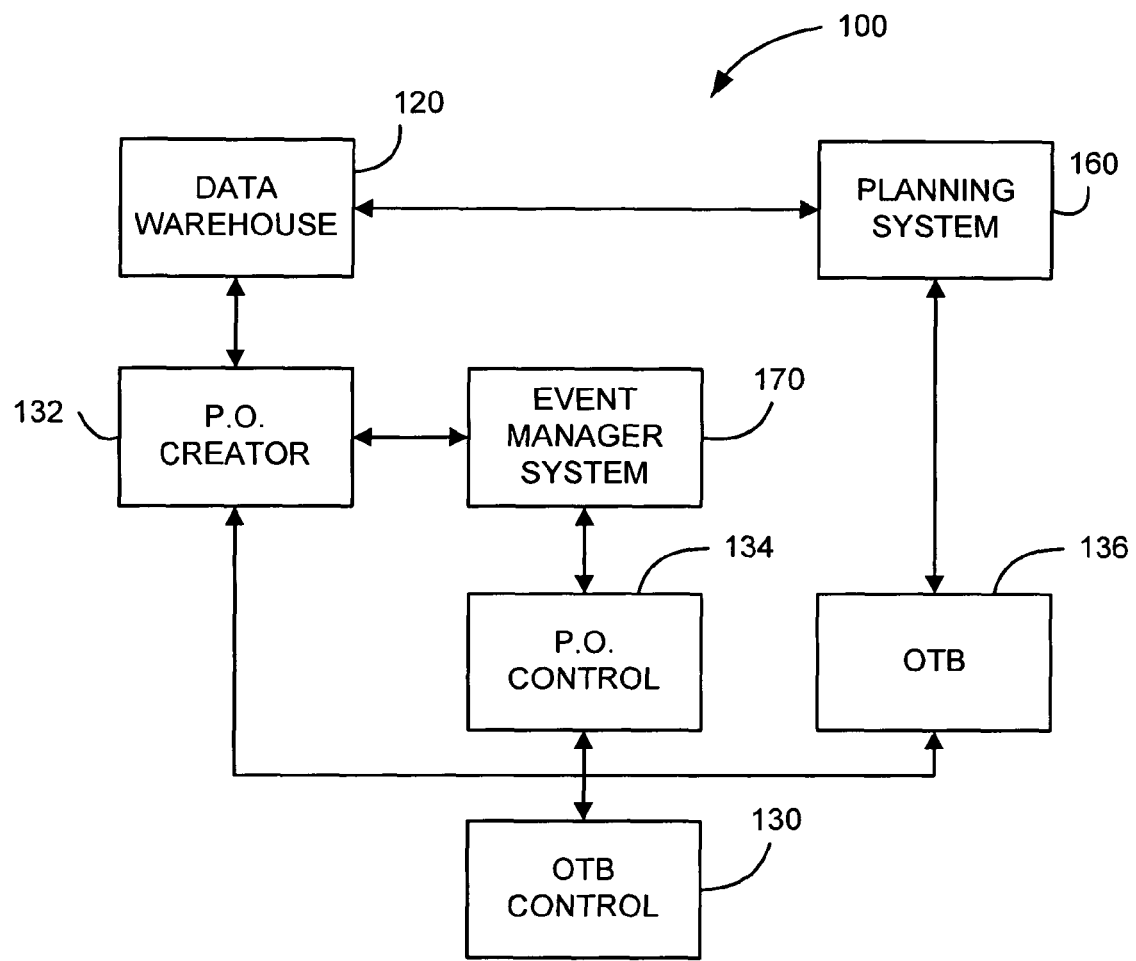
FIG. 1 is a general block diagram illustrating a system for processing data related to retail operations and planning, according to exemplary embodiment.

Referring now to FIG. 1, a general block diagram is shown illustrating an open-to-buy (OTB) system 100 for processing data related to retail operations and planning, according to exemplary embodiment. The OTB system 100 includes a data warehouse 120, a purchase order creator 132, an OTB control system 130 and a purchase order control system 134.

The OTB system 100 may be implemented as a workbench that may be a data processing system or software configured to control, display, interface with operators, or perform other operations to manage purchase orders. The OTB control system 130 is preferably implemented in an SAP-based workbench, interface, and architecture, but any other systems may be utilized.

The OTB system 100 may be implemented as a single system, a distributed system, or any combination thereof. The OTB system 100 may be implemented using a single computing system, a plurality of computing systems, software, hardware, or any other system or combination of systems to perform the functions described herein.

Data warehouse 120 is a data repository configured to receive, sort, and process information related to retail operations and planning. The data warehouse 120 may also be implemented as using a single or multiple systems. The data warehouse 120 may further include one or more functions associated with it to permit a user to efficiently organize and retrieve stored data. The OTB system 100 is sufficiently flexible to accommodate any of a variety of types of data warehouses 120, such as databases, for example.

In certain embodiments, the data warehouse 120 may be adapted to generate rules or checks to be used in the processing of purchase orders. In other embodiments, a planning system 160 may be provided to generate planning data, rules, checks and budgets, and to provide such information to the data warehouse 120. In this regard, the rules or checks may include a planning data or planning budgets including budget buckets corresponding to delivery periods and order periods, for example. The planning data or budgets are provided by the data warehouse 120 to the OTB control system 130, which may be included in a purchase order workbench.

The purchase order workbench may be a data processing system configured to allow a user to create, monitor, and receive approval for purchase orders for obtaining products or other supplies from a supplier. According to an exemplary embodiment, the purchase order creator 132, the purchase order control system 134, and the open-to-buy control system 130 are included in the workbench.

Purchase order creator 132 may be any system or method for creating electronic purchase orders. An electronic purchase order may be any type of purchase order in an electronic format. Purchase order creator 132 may include one or more functions to facilitate creation of the electronic purchase order. For example, purchase order creator 132 may include an auto fill function to automatically populate an electronic purchase order with previously stored data. Additionally, purchase order creator 132 may include a user interface configured to receive and display purchase order information with a user. Upon creation of a purchase order, the purchase order creator 132 provides the purchase order information to the data warehouse 120 for use in future planning or recalculation of planning data or budget. The purchase order information is also provided to the purchase order control system 134. An event manager system 170 may be provided to facilitate communication between the purchase order creator 132 and the purchase order control system 134. The event manager system 170 may receive commands from the purchase order control system 134 to, for example, initiate the creation of a purchase order and may process that command by issuing a command to the purchase order creator 132.

Purchase order control system 134 may be any system for controlling and monitoring electronic purchase orders. Purchase order control system 134 includes one or more functions configured to allow a user to manipulate or receive information related to any existing purchase order. For example, a user may utilize purchase order control system 134 to retrieve information related to a specific purchase order and modify one or more attributes of the retrieved purchase order.

The purchase order control system 134 provides purchase order information to the OTB control system 130, which is configured to facilitate automated approval or rejection of electronic purchase orders including both procurement and budget check functions. The OTB control system 130 receives an electronic purchase order as input and applies one or more rules to the electronic purchase order to determine whether the electronic purchase order should be approved or rejected. The rules, or checks, are based on the planning budget which is based on the planning data received from the data warehouse 120. Planning budgets or buckets may be generated from the planning data at either the data warehouse 120, the OTB control system 130 or in another module lying between the two. According to an exemplary embodiment, the one or more rules includes at least one budget rule. A budget rule may define the amount of money that is available for a purchase order based on information contained in the purchase order. For example, a purchase order may include a time frame for the purchase order, and the rule may be used to define the amount of money that is available in that time frame. According to alternative embodiments, the one or more rules may also include rules directed to the timing during which purchase orders may be requested. In other embodiments, other types of rules may be incorporated into the OTB system 100. The OTB control system 130 will be further discussed below with reference to FIGS. 2-5.

According to alternative embodiments, a purchase order workbench may further include more, fewer, or different systems to facilitate creation, processing, and maintenance of purchase orders. Further, functions associated with one or more systems may alternatively be associated with one or more alternative systems. For example, purchase order creator 132 may be implemented as a component of purchase order control system 134.

Figure 2:
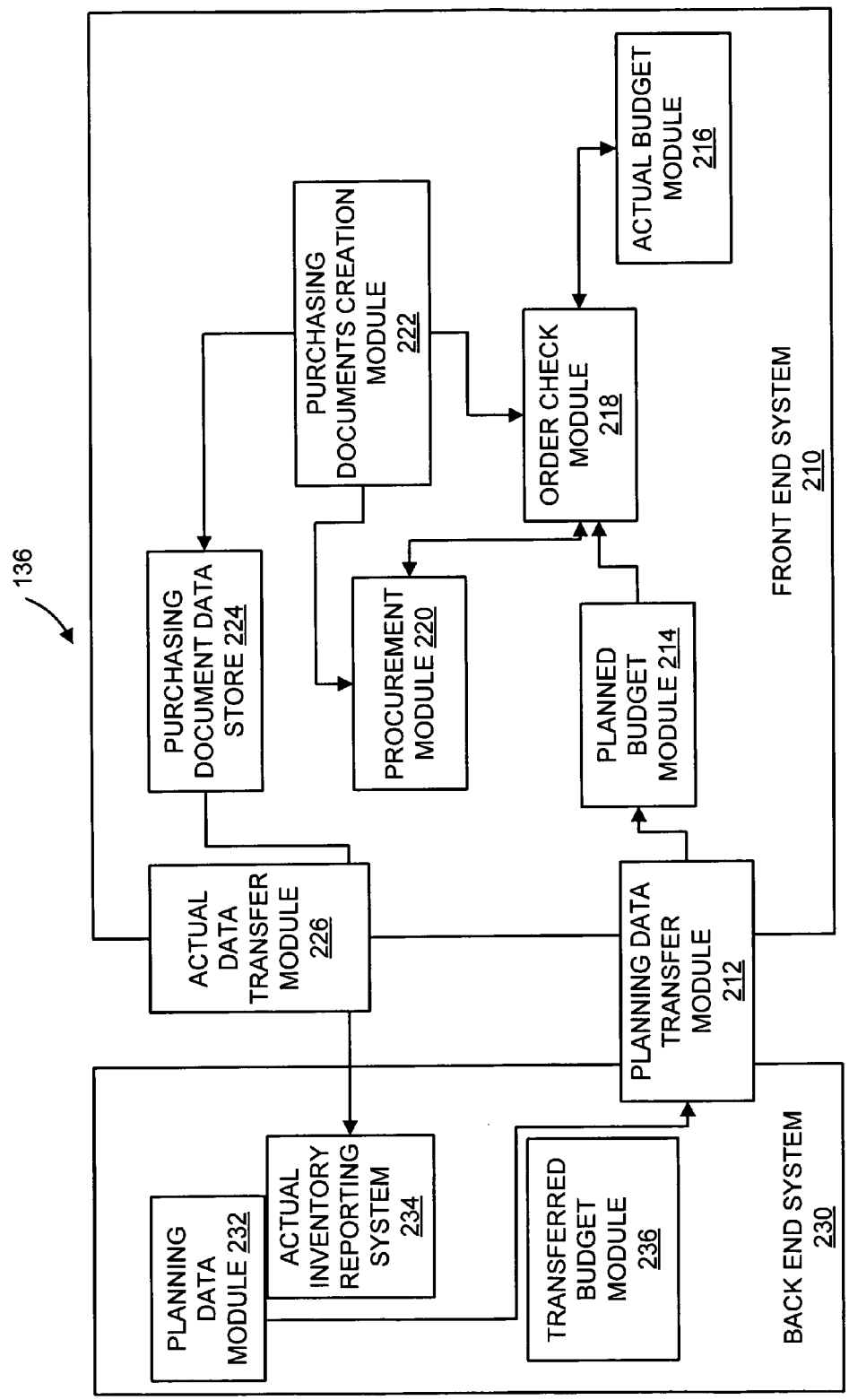
FIG. 2 is a block diagram illustrating an open to buy control system, according to an exemplary embodiment.

Referring now to FIG. 2, a block diagram illustrates open to buy system 136, according to an exemplary embodiment. Open to buy system 136 includes a plurality of components configured to implement one or more functions to facilitate acceptance or rejection of an electronic purchase order. Open to buy system 136 may be implemented as a purchase order processing system as will be further discussed below with reference to FIGS. 3-5.

Open to buy system 136 includes a front-end system 210 configured to provide an interface between one or more users and a back-end system 230, according to an exemplary embodiment. Although shown as separate components, front-end system 210 and back-end system 230 may alternatively be implemented as a single system. Yet further, open to buy system 136 may include a plurality of either front-end systems 210 or back-end systems 230. For example, open to buy system 136 may include a plurality of front-end systems 210 to allow multiple users in distributed locations to access uniform and synchronized information stored on backend system 230.

Further, each of the front-end system 210 and the back-end system 230 may further be configured to each include lower-level front-end and back-end systems. In this regard, one or both of the front-end system 210 and the back-end system 230 may include components which allow user interaction and components which interface with other modules.

Front-end system 210 is configured to allow one or more users to perform functions implemented using open to buy system 136. In the illustrated exemplary embodiment, the front-end system 210 includes a planning-data transfer module 212 adapted to receive data from the back-end system 230. The data received may include, for example, planned budget buckets, sales and budgeting information based on prior experience, current market conditions, and other factors. Additional detail relating to the planning data and its generation is provided below with reference to the description of the back-end system 230.

The planning-data transfer module 212 may generate a budget or a set of budget buckets, or budget portions, based on the planning data received from the back-end system 230. The budget information generated can then be stored in a planned budget module 214. In other embodiments, the planning-data transfer module 212 may receive and transfer raw planning data, and the planned budget module 214 may generated the budget information. In still further embodiments, the budget information may be generated within the back-end system 230 and forwarded to the planned budget module 214 through the planning data transfer module 212.

When a purchase order is received or submitted for processing, the front-end system 210 applies a set of checks or rules to determine whether the order should be processed as submitted. In this regard, the front-end system 210 is provided with an order check module 218. The order check module 218 accesses budget information from the planned budget module 214 to perform the necessary checks.

The order check module 218 may be configured to apply one or more open to buy rules to an electronic purchase order to determine whether the electronic purchase order should be accepted or rejected. A budget rule may be a type of open to buy rule. The order check module 218 may include a currency translation function configured to convert generic financial information to specific financial information relevant to the current user of front-end system 210. Status processing function 218 may be any function configured to determine whether no check was performed, a positive check result was received or a negative check result was received.

If the order check module 218 determines that the purchase order can be processed, the order is forwarded to a procurement module 220, which may communicate, directly or indirectly, over an interface with a user, such as a supplier or a vendor, to place the order. The procurement module 220 may be configured to receive and process information related to the creation, modification, or cancellation of an electronic purchase order.

If, on the other hand, the order check module 218 determines that the rules do not allow the purchase order to be processed as submitted, the order, the rules, the budget or a combination thereof may be modified to allow the processing of the purchase order. In this regard, the procurement module 220 may be configured to procure necessary additional budget (e.g., changing the value, delivery period, etc.) with the support of the purchasing documents creation module 222 or by requesting for a special release of additional budget that allows to overbook the corresponding budget bucket. If enough budget can be obtained within the procurement module 220, the order check module 218 can determine that the order can be processed. This aspect is described in greater detail below with reference to FIGS. 9 and 10. The front-end system 210 may be provided with a used budget module 216 to store budget information that is exhausted by existing purchase orders which may have been updated or revised by the order check module 218.

Once the order has been placed by the purchasing documents creation module 222, a confirmation may be received from the supplier or vendor. The information relating to the placement of the order may be generated by a purchasing documents creation module 222. In this regard, the information may include any revisions to the purchase order required by the order check module 218. The information generated by the purchasing documents creation module 222 may then be stored in a purchasing documents data store 224. In certain embodiments, an actual data transfer module 226 may be provided to supply the actual order and budget information to the back-end system for planning purposes.

According to alternative embodiments, front-end system 210 may include more, fewer, and/or different functions to provide a user interface and perform calculations related to purchase order processing. The described functions may be implemented using hardware, software, integrated circuits or any system configured to perform the functions described herein.

Back-end system 230 is configured to process data, store data, facilitate planning, provide reporting, and provide other functions associated with purchase order management using one or more functions and/or components. The back-end system 230 includes a planning data module 232 adapted to generate a merchandise ordering plan including all planned data (e.g., planned sales, planned margin, planned inventory, planned receipts and planned budget buckets). The merchandise ordering plan may include information relevant to, for example, order scheduling and budgeting. The planning data module 232 may be configured to receive information from at least an order forecasting system and an actual inventory reporting system 234. The order forecasting system (not shown) may include information from various sources, such as industry outlook reports, relating to expected market conditions, for example, The actual inventory reporting system 234 provides information to the planning data module 232 relevant to the actual inventory currently available, which may include expected deliveries. In this regard, the actual inventory reporting system 234 may include information received from the front-end system 210, through the actual data transfer module 226, relating to purchase orders already placed.

In certain embodiments, the planning data module 232 may be adapted to generate budget information. The budget information may be stored within the back-end system 230 in a transferred budget module 236. The transferred budget module 236 may be used to store planned budget buckets that have been released and/or transferred to the planned budget module 214. This may be used to reduce data traffic by requiring transfer of only the changed and new buckets from the planning data module 232 and the transferred budget module 235 to the planned budget module 214.

As noted above, the generation of the budget information from the planning information may be accomplished by either the planning-data module 232, the planning data transfer module 212 or the planned budget module 214 or the transferred budget module 236. In this regard, the budget information may include a budget allocation into a plurality of budget portions, or buckets, each corresponding to, for example, a delivery period, an order period, a merchandise category or a combination thereof.

According to alternative embodiments, backend system 230 may include more, fewer, and/or different functions to provide information and perform calculations related to purchase order processing.

Calculate open to buy rule transferred budget module 236 may be a function configured to generate one or more rules or functions to be applied to an electronic purchase order to determine whether the electronic purchase order should be accepted or rejected. The generation of the one or more rules and their application to electronic purchase orders are further discussed below with reference to FIG. 5.

Front-end system 210 and backend system 230 may be associated with one or more interface calls. An interface call is a message sent between front-end system 210 and back end system 230 or within either system. The interface call may be a request for information, a request for processing, and/or a communication of data. Each interface call may be associated with one or more functions or components within open to buy system 136.

A purchase order processing interface call is a communication from front-end system 210 to back-end system 230 communicating a request for the creation, modification, and/or cancellation of a purchase order. Modifications may include changes to amounts, changes to timing information, or any other modification. Based upon receipt of an interface call, the back-end system 230 is configured to create, modify, and/or cancel a purchase order.

A calculate open to buy rule interface call is a communication from back-end system 230 to front-end system 210 including an open to buy rule to be applied to electronic purchase orders. Based upon receipt of the open to buy rule, is the front-end system 210 can be configured to store the open to buy rule for application to future electronic purchase order requests in, for example, the order check module 218, which may further be configured to perform a validation check on the open to buy rule upon receipt as further described below with reference to FIG. 3.

An open to buy interface call is a communication from planned budget module 214 to the order check module 218 within the back-end system 230 including planning information to be used in the generation of open to buy rules. The planning budget information may include at least planned receipts, pending purchase orders, open purchase orders, order forecasts, receipts, and the change in end of planning period inventory. Interface call may further include a transfer from order check module 218 to the used budget module 216. The transferred information may include used budget information according to existing purchase orders.

Figure 3:
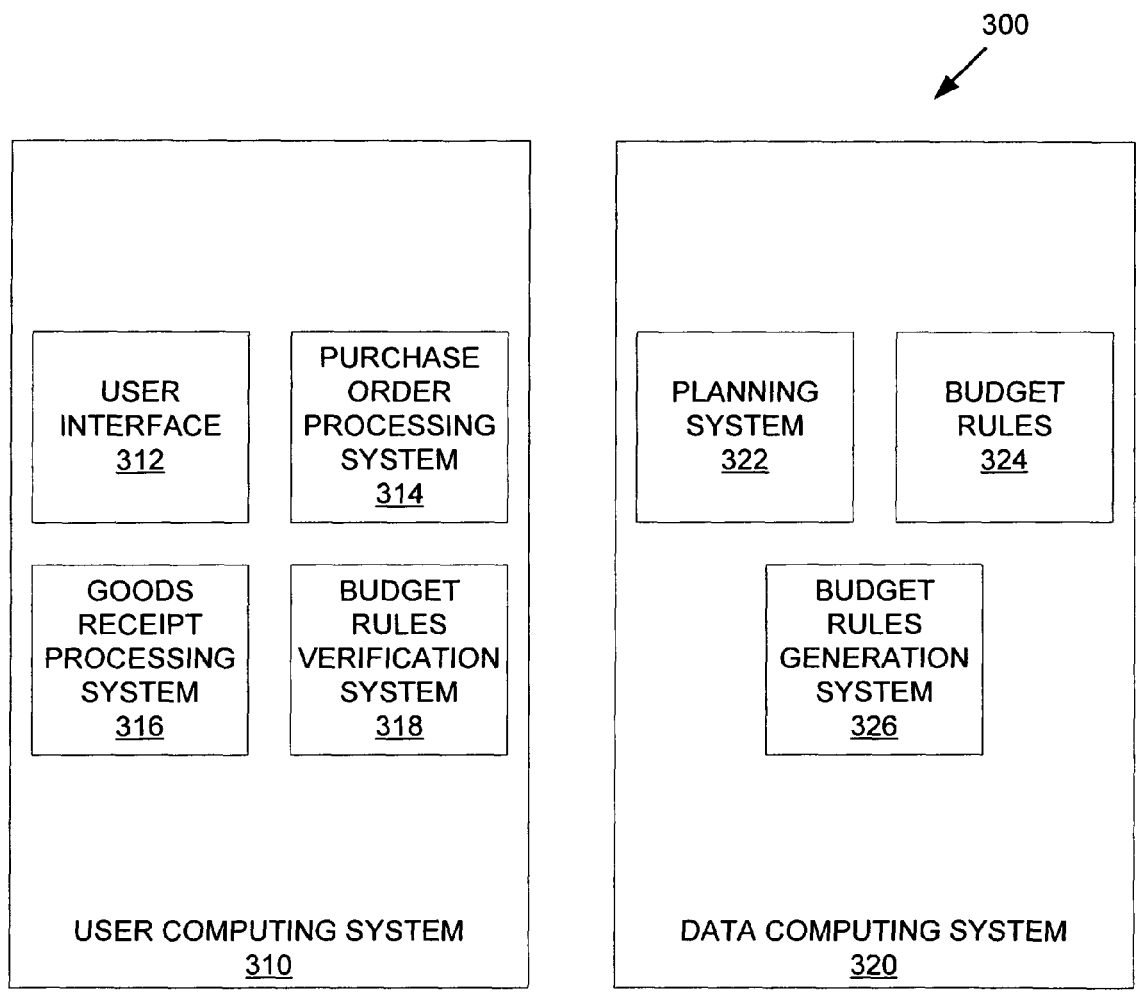
FIG. 3 is a general block diagram illustrating a purchase order processing system for processing electronic purchase orders, according to an exemplary embodiment.

Referring now to FIG. 3, a block diagram illustrates a purchase order processing system 300 for processing electronic purchase orders, according to an exemplary embodiment. Purchase order processing system 300 includes a user computing system 310 and a data processing system 320. Although shown as separate systems, system 310 and system 320 may be implemented as a single system. Further, functions associated with either system 310 or system 320 may alternatively be associated with the other of system 310 or system 320 or implemented within a stand-alone system.

According to an exemplary embodiment, system 300 may be implemented using a single computing system. Accordingly, system 300 may be any type of computing device, including work stations, laptops, notebooks, personal digital assistants (PDAs), or other equipment configured to receive input, store data in a memory, execute a series of instructions, and provide an output. System 300 may include a processor configured to execute a set instructions or computer program, such as an Intel® PENTIUM® processor sold by Intel Corp. of Santa Clara, Calif.

According to an alternative embodiment, system 300 may be implemented using computing systems in a networked environment. System 300 may include a first computing system implementing user computing system 310, a communication network, and a second computing system implementing data processing system 320. The first and second computing systems may be any type of computer system, such as the computer system described above. The first and second computing systems further include devices for communicating over the communication network.

According to an exemplary embodiment, the communication network may be the Internet. According to alternative embodiments, the communication network may be any other type of network, such as a virtual private network (VPN), an Ethernet, or a Netware network. Further, the network can include a configuration, such as, a wide area network (WAN) or a local area network (LAN).

According to an alternative embodiment, system 300 may include a plurality of user computing systems 310. For example, wherein system 300 is configured to operate in a networked environment, system 300 may include multiple user computing systems 310 configured to communicate with data processing system 320 over the communication network. System 300 may further include a plurality of data processing systems 320. The data processing systems 320 may be in communication with each other such that uniform rules are provided to the user computing system 310, further discussed below with reference to FIG. 5.

User computing system 310 may be any type of system configured to allow a user to enter and receive data related to electronic purchase order processing. For example, user computing system 310 may include a user interface configured to allow a user to input details related to a purchase order request. The details may include an item to be purchased, a number of items to be purchased, a total cost of items to be purchased, a time frame for delivery of items to be purchased, a payment due date for items to be purchased, etc. An exemplary user interface 312 is further described below.

User computing system 310 may further be configured to generate or receive an electronic purchase order. An electronic purchase order may be any type of purchase order stored in an electronic format.

User computing system 310 may further be configured to provide a user with the results of an electronic purchase order processing. For example, wherein an electronic purchase order is approved, user computing system 310 may be configured to display the approval to the user. User computing system 310 may further be configured to perform additional tasks related to the approval, such as, printing out the approved purchase order, forwarding the purchase order to the target supplier, updating pending order values, modifying rules, etc. These additional tasks are discussed in further detail below with reference to FIGS. 4 and 5.

Alternatively, wherein an electronic purchase order is rejected, user computing system 310 may be configured to display the rejection to a user and present the user with choices for remedial actions based on the rejection. For example, user computing system 310 may redisplay the rejected purchase order such that the user can modify one or more attributes of the rejected purchase order and resubmit the purchase order. User computing system 310 may further provide the user with feedback based on the rejection to advise the user in making amendments to the rejected purchase order. Exemplary advice can include limitations on the number of items that can be ordered, limitations on the total cost for the purchase order, limitations on the time frame for the order, description of other pending orders, etc.

Alternatively, user computing system 310 may be configured to initiate a procurement process based upon a rejection of the electronic purchase order, as illustrated below with reference to FIGS. 9 and 10.

Alternatively, where a purchase order is rejected, certain classes of users may be allowed to modify the budget rules such that the purchase order will be allowed. For example, a class of users may have approval to override normal budget rules in special circumstances, as will be further discussed below with reference to FIG. 5.

User computing system 310 includes a user interface 312, a purchase order approval system 314, a goods receipt logging system 316, and a budget rules verification system 318. User computing system 310 may further include additional, different, and/or fewer components and/or subsystems configured to facilitate purchase order processing.

User interface 312 may be any type of user interface configured to facilitate interaction between a user and user computing system 310 and/or data processing system 320. According to an exemplary embodiment, user interface 312 may include a plurality of selectable links configured to allow the user to access functionality provided by or through user computing system 310. User interface 312 further includes a plurality of input and output fields, the input fields configured to receive information from the user and the output fields configured to display information to the user.

Purchase order request processing system 314 is a system configured to receive purchase order information from a user through user interface 312 or another source, generate an electronic purchase order, apply at least one rule to the electronic purchase order, and provide an acceptance or rejection of the electronic purchase order to the user through user interface 312 based on the application of the rule. Accordingly, purchase order request processing system 314 may include one or more of purchase order creator 132, purchase order control system 134, and/or OTB control system 130, as discussed above with reference to FIG. 1. Budget rules and the process for accepting or rejecting an electronic purchase order are provided in more detail below with reference to FIG. 5.

Goods receipt processing system 316 is a system for processing information related to the receipt of goods for an existing electronic purchase order. According to an exemplary embodiment, goods receipt processing system 316 is configured to receive goods receipt information from a user through user interface 312 and provide the information to data processing system 320.

Budget rules verification system 318 is a system configured to receive at least one budget rule from data processing system 320 and perform a verification check on the at least one budget rules.

Data processing system 320 may be any type of system configured to generate and maintain budget rules and associated data. Data processing system 320 includes a planning system 322 and a budget rules generation system 326.

Planning system 322 is a system configured to generate and provide planning data to the budget rules verification system 318 of the user computing system 310. The planning data may be data that is generated by planning system 322 or data that is received as an input to planning system 322. For example, planning system 322 is configured to receive at least order forecast information and actual inventory information as inputs. The order forecast information is a projection predicting information related to orders to be placed in the future.

The actual inventory information contains the actual inventory for the user for which the budget rules are being generated. The input information may be received in real time, periodically, based on events, and/or manually entered as needed. The planning data may be relevant to the generation of a planning budget, including buckets associated with each delivery period and order period. The planning budget and the buckets can be generated by the budget rules generating logic 326 using the planning data, as described below.

Planning system 322 may be further configured to generate budget rules reports. Budget rules reports contain a variety of information related to the creation and maintenance of the budget rules. Reports may be generated and customized for a variety of uses including strategic financial planning, store planning, merchandise planning, roll-out planning, etc. The planning system 322 may be adapted to re-calculate a planned budget either manually or automatically. The recalculation may be based on actual data received, for example, from previous planning cycles.

The planning system 322 may be configured to receive and store all of the information from various sources needed to generate the budget rules. The planning system 322 may further store additional information such as information used in generating budget rules reports.

Exemplary information stored in the planning system 322 may include planned receipts, pending purchase orders, open purchase orders, order forecast, receipts, and the difference between the planned inventory at the end of the planning period and the forecast inventory at the end of the planning period. The data may be stored and searchable according to a variety of key fields such as client name, week, month, delivery period, purchasing period, season type, season year, merchandise category, rollout date, season level, assortment level, organizational level, etc. Key fields may include any data category and can be used as a filtering criteria for the data. Thus, a customer or user may filter, sort, organize or retrieve the data based on any such key fields.

According to an exemplary embodiment, data stored in the planning system 322 may be stored in a planning currency. Advantageously, utilizing a planning currency allows budget rules to be created independent of volatility or differences in currency. By removing currency differences and volatility, budget rules may be more uniformly and effectively applied.

Budget rules generating logic 326 is configured to access data stored in the planning system 322 to generate at least one rule. According to an exemplary embodiment, the rule may be a budget rule. As noted above, the rule, or check, may be expressed in the form of one or more budget buckets. According to an exemplary embodiment, the at least one budget rule is a limit based on the amount of money available to purchase merchandise for a given time period. The creation of the at least one budget rule is further discussed below with reference to FIG. 4.

Data processing system 320 may further include more, fewer, or different configurations of subsystems and/or functions to perform the functions described herein. For example, data processing system 320 may include an inventory tracking system to facilitate generation of budget rules. Further, systems or function described as associated with a particular system or subsystem of system 100 may alternatively be associated with any other system within system 100. For example, budget rule calculations may alternatively be performed within data processing system 320.

Figure 4:
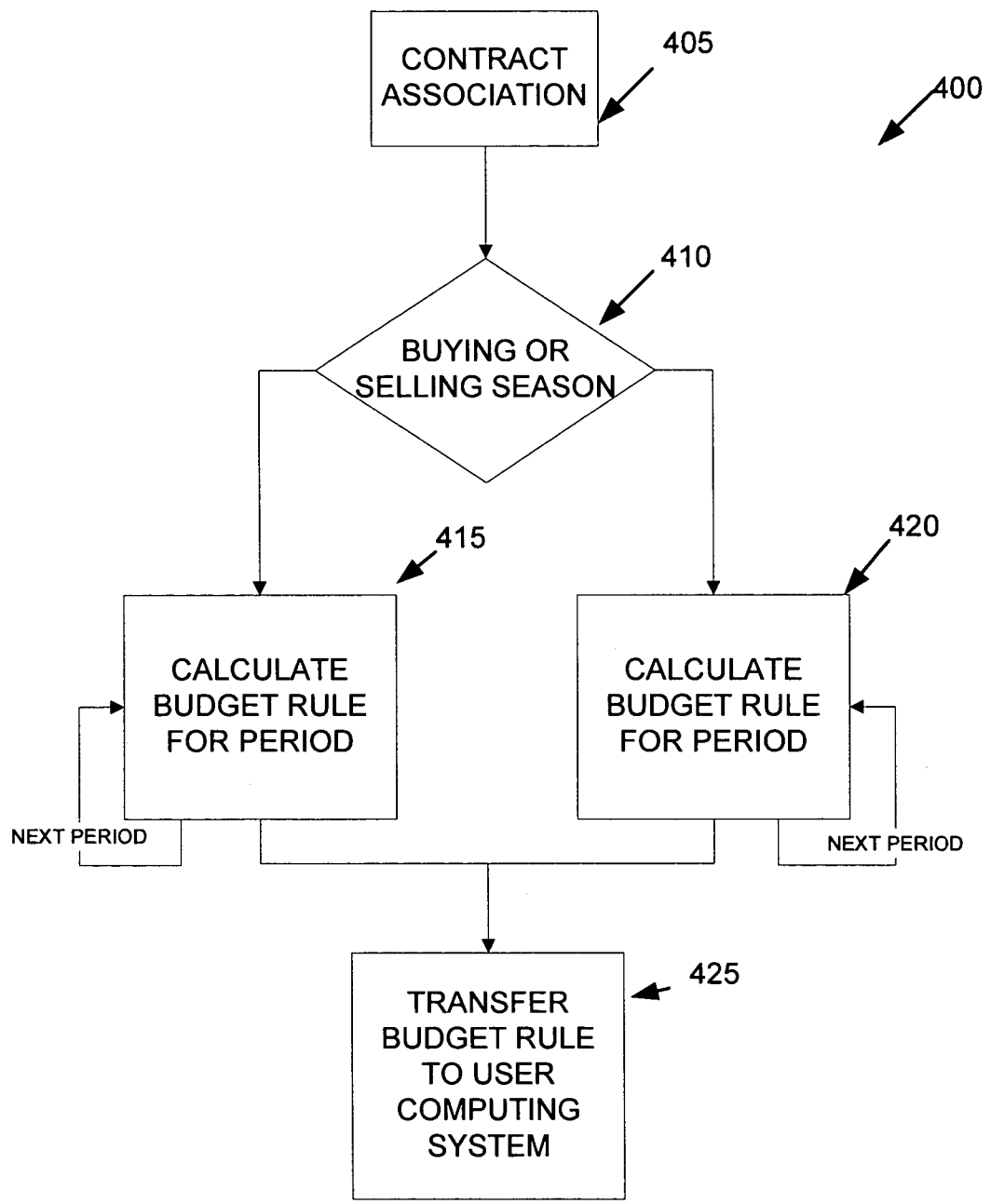
FIG. 4 is a flowchart illustrating a method for creating a budget rule, according to an exemplary embodiment.

Referring now to FIG. 4, a flowchart 400 is shown illustrating a method for creating a budget rule according to an exemplary embodiment. The budget rule may be created by budget rules generating logic 326 using data stored in the planning system 322 or from any other source.

In a step 405, a specific contract is selected to be associated with the generated set of business rules. The specific contract may be directed to a particular retailer, a particular supplier, a particular merchandise line, etc. The budget rule will be generated based upon data associated with the specific contract.

In a step 410, a determination is made whether the budget rule is to be created to apply to purchase orders received during a planning and buying phase or to purchase orders received during an in-season or selling phase. According to alternative embodiment, further alternatives may be provided to modify the scope and/or focus of the budget rule to be created. For example, budget rules may also be created to apply to specific stores, specific merchandise, etc.

In a step 415, a budget rule is calculated for a period within a planning period. A period may be a week, a month, a year or any other time period within a planning period. The period may correspond to a single delivery period, for example. Alternatively, budget rules may be calculated to apply to the entire period.

According to an exemplary embodiment, the budget rule is a limit equal to the values of planned receipts minus pending purchase orders minus open purchase orders minus forecasted purchase orders minus receipts. The values are generally obtained by accessing data stored in the planning system 322. The budget rule may be roughly equivalent to the inflows minus all outflows for a period. The amount remaining is the amount that is available to purchase merchandise for the sub-period.

Following calculation of the budget rule for the period, the period may be incremented to create a budget rule for the next period within the planning period and step 415 may be repeated. This iterative step may be repeated for each sub-period within the planning period to create a set of budget rules.

Alternatively, wherein the created budget rule is to be applied to purchase orders received during an in-season or selling phase in step 410, a budget rule is calculated for a period within a selling period in a step 420. The calculated budget rules is similar to the budget rule in step 415 in that the budget rule starts with planned receipts minus pending purchase orders minus open purchase orders minus forecasted orders minus receipts. However, a change in the end of period inventory is added to this calculation. The change in the end of period inventory is based on the planned end of planned inventory minus the forecasted end of planned inventory. The forecasted end of planned inventory is created based on actual inventory, received by planning system 322 as an input. The amount remaining is the amount that is available to purchase merchandise for the period.

Following generation of the one or more budget rules, the rule or set of rules may be transferred from data processing system 320 to user computing system 310 in a step 425. The budget rules may be transferred periodically, based upon receipt of a purchase order, based on a detected change in one or more budget rules, based on manual inputs, etc. In some embodiments, the budget rules for one or more delivery periods may be calculated even though some of the delivery periods may occur well into the future. As noted above, the system allows for recalculation of the planned budget either manually or automatically.

In the above described embodiment, the calculation or recalculation of the budget rules are allocated to delivery periods. In certain embodiments, as described below, a delivery period may correspond to one or more order periods. In this regard, in certain embodiments, the results of the calculation or recalculation may be allocated to the order periods corresponding to the delivery periods. Thus, a budget buckets may form a budget rule at the intersection of a delivery period and an order period.

Figure 5:
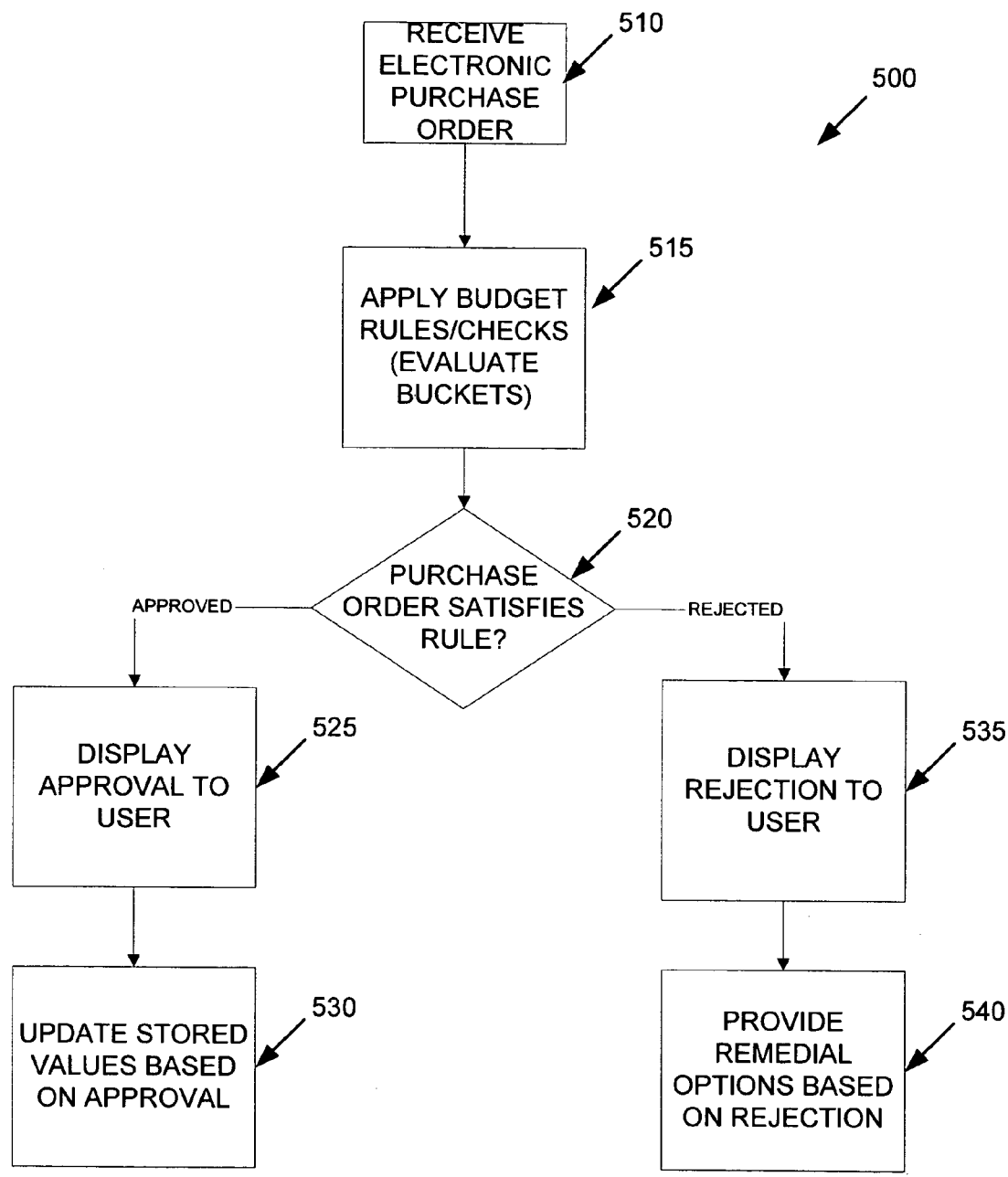
FIG. 5 is a flow chart illustrating a method for processing electronic purchase orders, according to an exemplary embodiment.

Referring now to FIG. 5, a flow chart 500 illustrating a method for processing electronic purchase orders is shown according to an exemplary embodiment. Electronic purchase orders are processed by applying one or more budget rules to the electronic purchase order to determine whether the purchase order is allowable according to the rules.

In a step 510, an electronic purchase order is received. The electronic purchase order for a sub-period may be received based upon user input through user interface 312 as described above. Alternatively, the electronic purchase order may be automatically generated. For example, the method for processing purchase orders may be used in conjunction with an inventory management system configured to automatically create purchase orders based on levels of inventory, changes in inventory, etc.

In a step 515, one or more budget rules are applied to the purchase order. Applying one or more budget rules to the purchase order may include subtracting the total cost under the purchase order from the amount of money available for purchasing to determine whether the total cost is less than the amount of money available. In this regard, the appropriate rule or check, such as the bucket corresponding to the current period, may be accessed. In the case of OTB allocation of planned budgets, the order period and the delivery period may be accessed. Following application of the one or more rules, a determination is made in step 520 whether the total cost of the purchase order is less than the amount of money available.

If the total cost of the purchase order is less than the amount of money available, the purchase order is approved in a step 525. Approval of the purchase order includes displaying an indicia to the user through user interface 222 to indicate that the purchase order is approved. Following approval of the purchase order, it may be necessary to update used budget module 216 in a step 530. In particular, the pending orders for the particular sub-period described in the purchase order are increased by an amount equal to the total cost of the purchase order.

Approval of the order may also include providing the user with the option to take one or more additional steps. For example, the user may be provided with an option to automatically forward the approved purchase order to the supplier for which the purchase was generated.

If the total cost of the purchase order is more than the amount of money available, the purchase order is rejected in a step 535. Rejection of the purchase order includes displaying an indicia to the user through user interface 222 to indicate that the purchase order is rejected and is generally accompanied for the reason for the rejection. For example, in some embodiments, the placement of a purchase order may require the existence of a budget bucket for the corresponding delivery period and order period. If no such bucket exists or the bucket has insufficient funds, the indicia may include a message such as "NO BUCKET FOR REQUESTED ORDER."

Following rejection of the purchase order, the user may be provided with one or more options based upon the rejection in a step 540. For example, the user may be provided with an opportunity to amend the purchase order such that the purchase order will be accepted with procurement module 220. Further, system 210 may be configured to provide the user with feedback indicating an allowable purchase order amount.

Alternatively, wherein a user has permission to modify the budget rules, the user may be provided with an option to modify one or more of the rules such that the purchase order will be allowed with procurement module 220. System 210 may further include constraints on a user's ability to modify the rules. For example, system 210 may include logic dictating that the user will only be allowed to modify rules for a first sub-period based upon a correlating change to a second sub-period. For example, a user may be able to increase the amount of money available in the first sub-period by decreasing the amount available in the second sub-period.

Purchase order processing may further include processing modifications and/or cancellations of existing purchase orders. Modifications that increase existing purchase order amounts may be processed as described above with the amount of the increase in the existing purchase order being treated as a new purchase order for that amount. Modifications to existing purchase order and/or cancellations of existing purchase orders may be processed without requiring approval or rejection. The budget rules may be modified to increase the amount of money available based upon a decrease or cancellation.

Although described in the context of purchase order processing for retail operations, system 210 may alternatively be applied to any system for processing electronic purchase orders by applying one or more rules to an electronic purchase order.

As noted above, the rules may be of various types including budget rules. In one embodiment, the budget rules allow for splitting of a purchase order and allocation of the purchase order among a plurality of order periods. A purchase order may correspond to a specific delivery period, and each delivery period may correspond to a plurality of order periods. As described below, the budget for the delivery period may be allocated into buckets, each bucket corresponding to one of a plurality of order periods.

Figure 6:
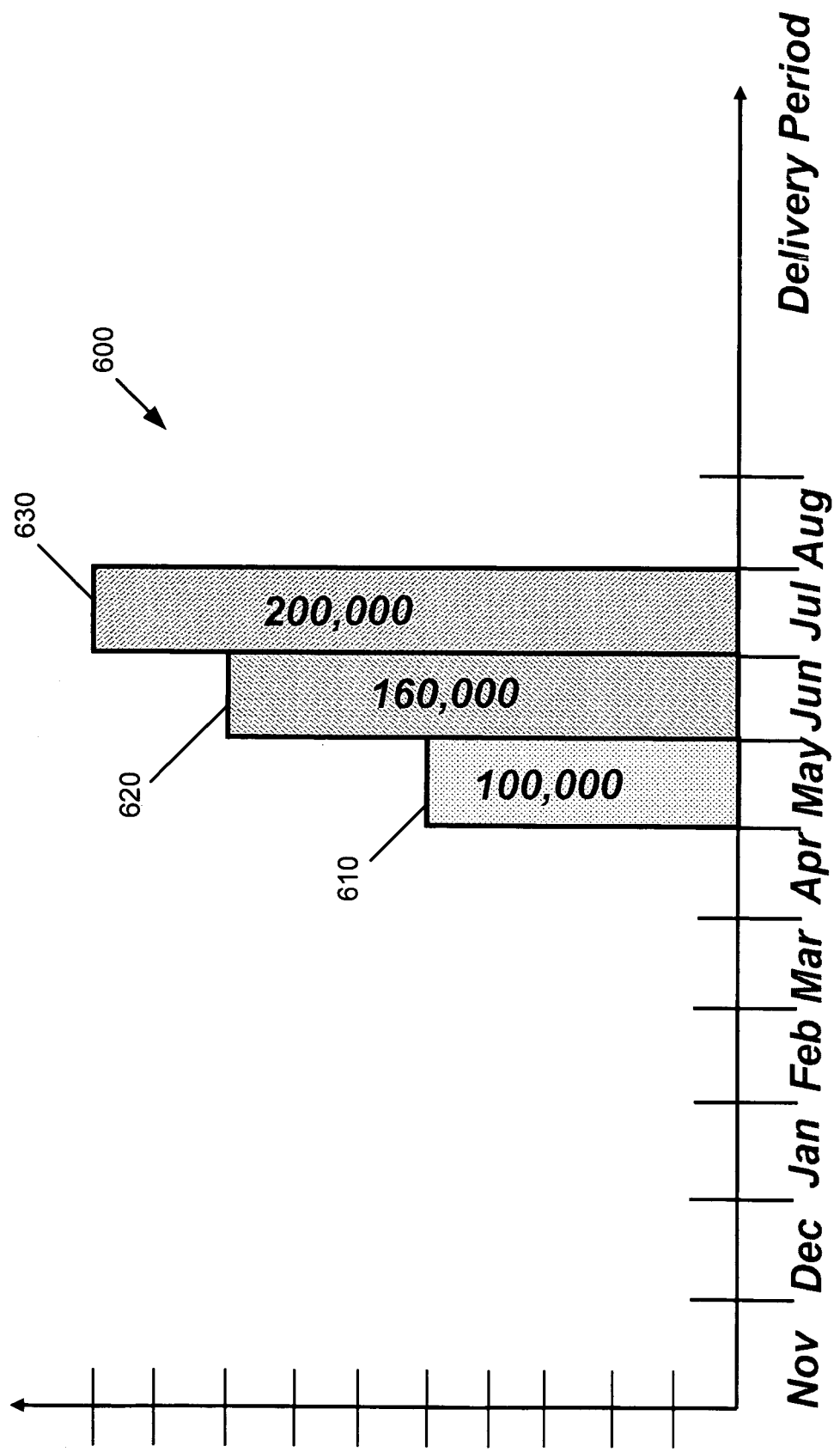
FIG. 6 is a chart illustrating an exemplary budget for a set of delivery periods.

For example, FIG. 6 illustrates an exemplary set 600 of delivery periods in a fashion season. The season includes three delivery periods 610, 620, 630, each corresponding to a particular month in the fashion season (e.g., May, June and July) and each having a designated budget. In the illustrated example, the May delivery period 610 is assigned a budget of US$100,000, the June delivery period 620 is assigned a budget of US$160,000, and the July delivery period 630 is assigned a budget of US$200,000.

Figure 7A:
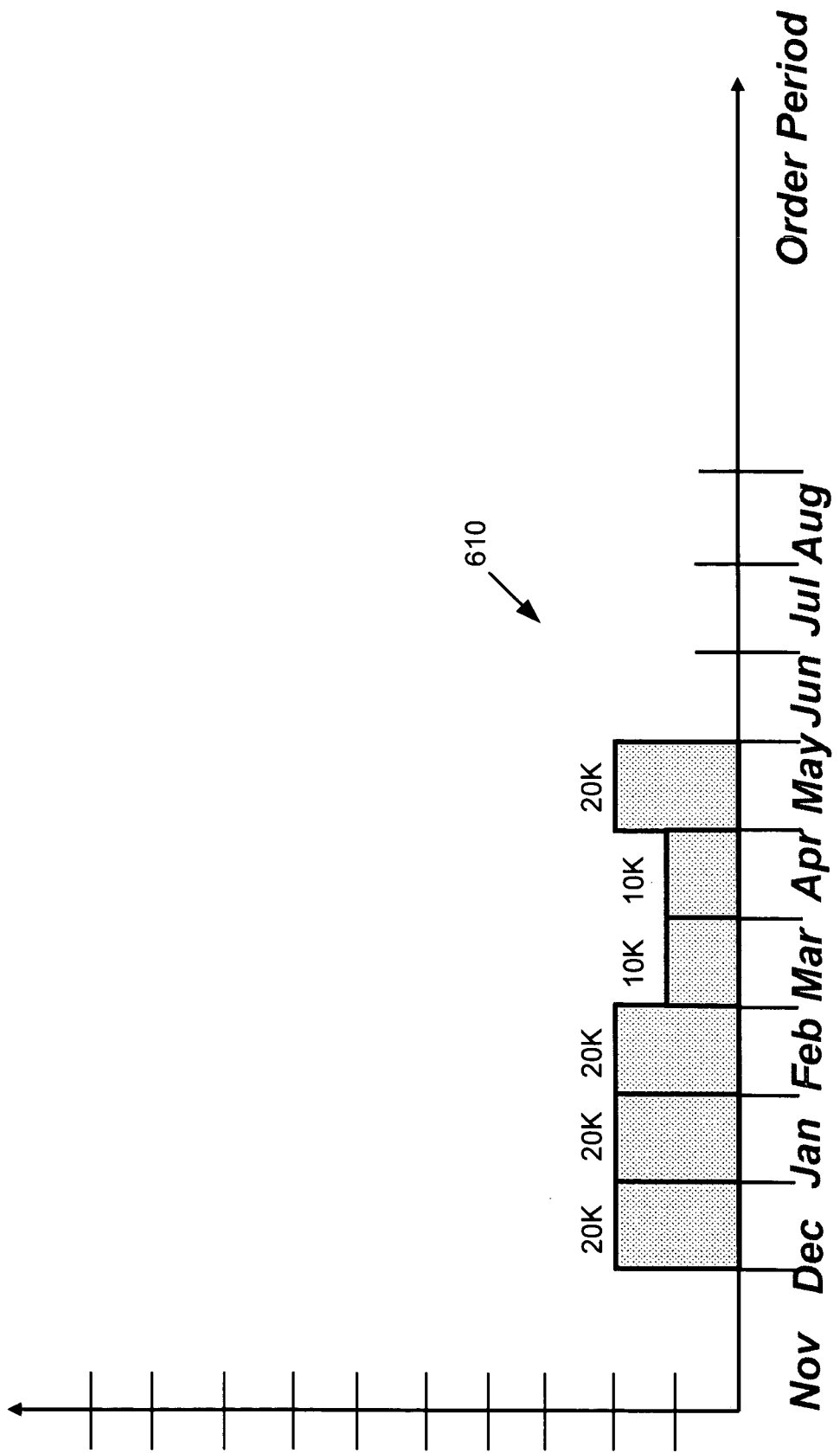
FIGS. 7A-C are charts illustrating an exemplary allocation of the budget for each delivery period of FIG. 6 into a plurality of order periods.
Figure 7B:
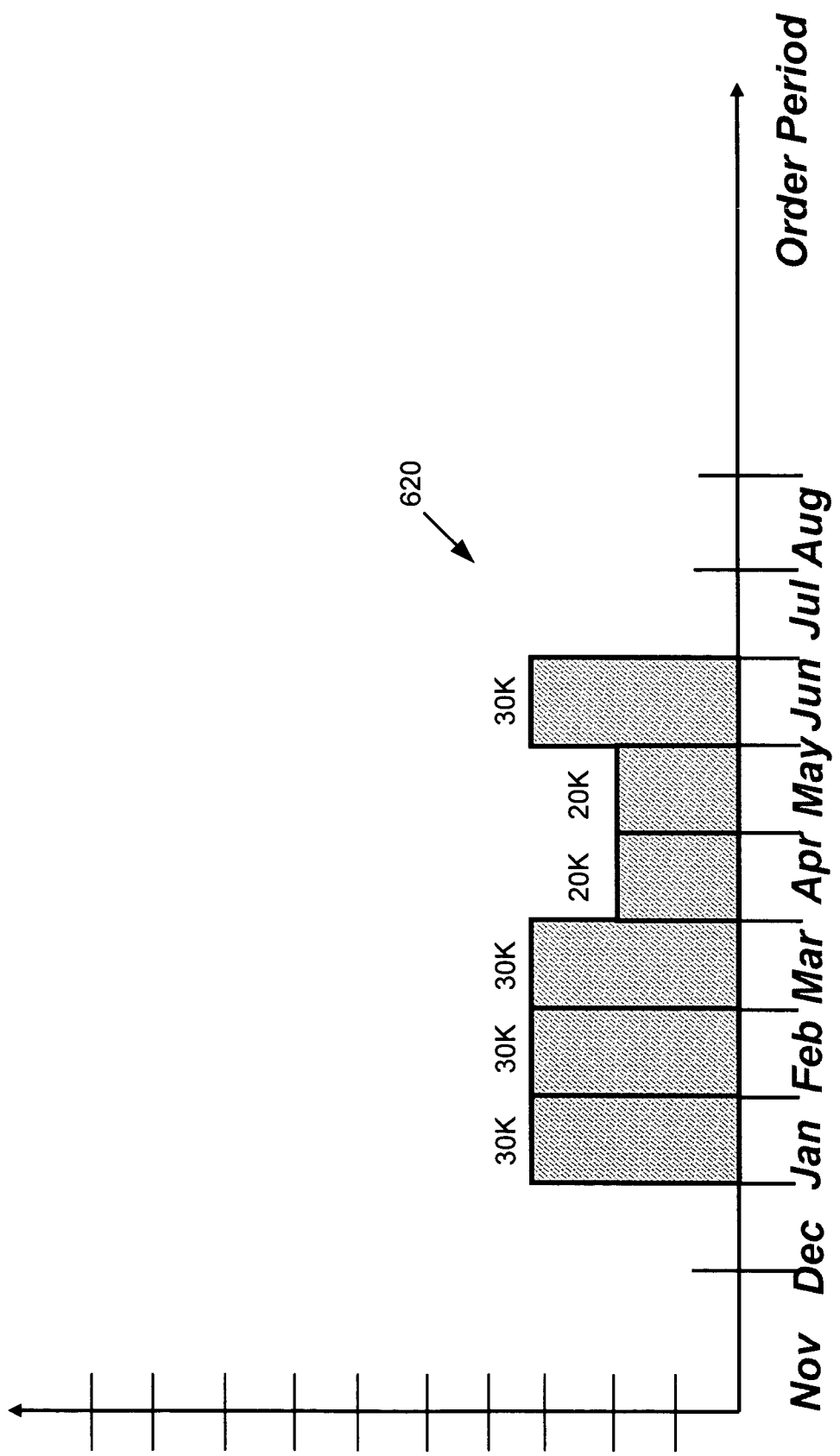
Figure 7C:
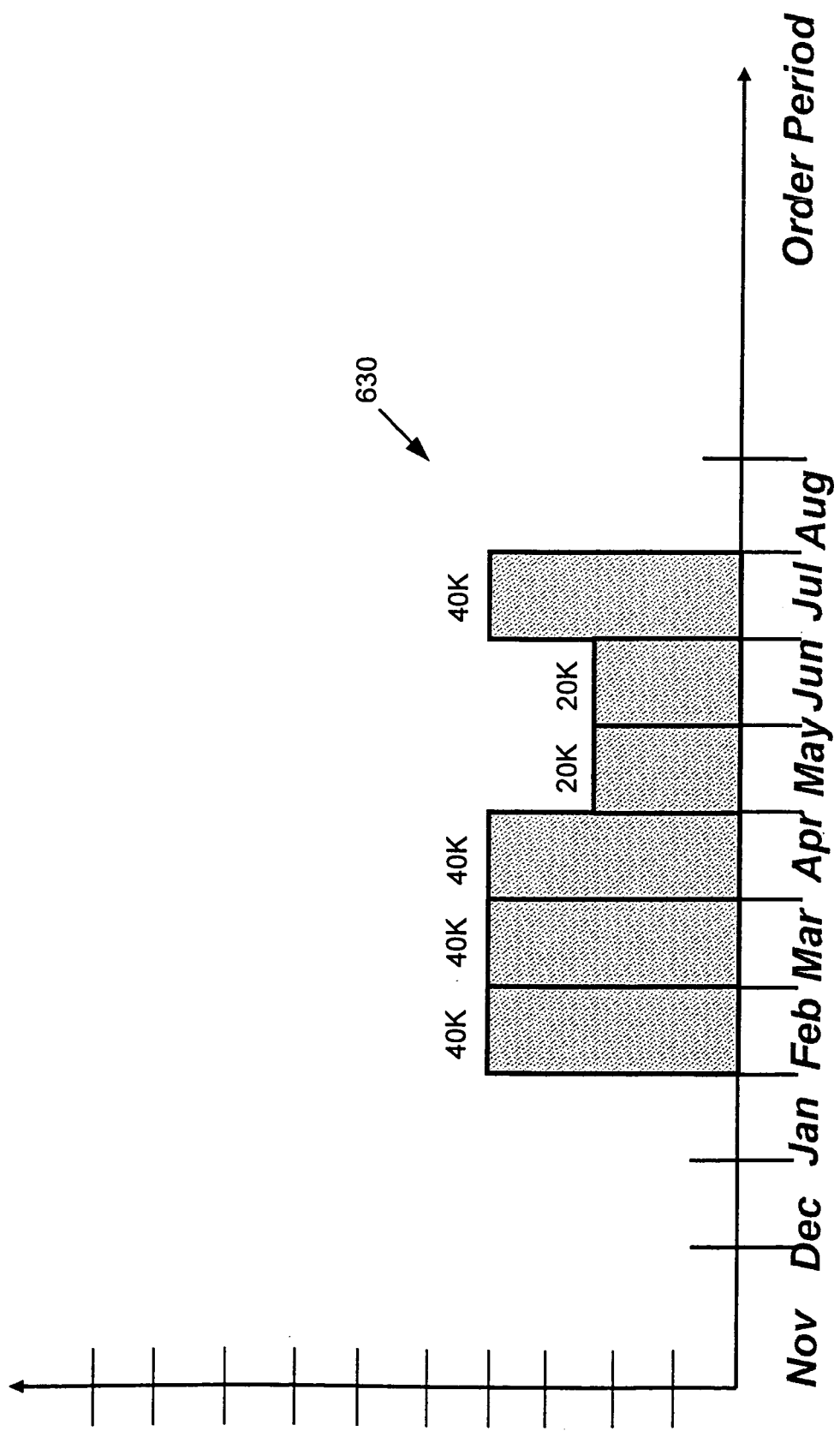

The budget for each delivery period 610, 620, 630 can be split and allocated to a plurality of ordering periods. For example, as illustrated in FIG. 7A, the budget for the May delivery period 610 may be allocated to the six months preceding the delivery month. Dividing the budget in this manner can facilitate more efficient ordering by limiting ordering of merchandise unnecessarily too early. Specifically, the purchase orders for a delivery period can be processed such that orders are placed later to delay binding of the funds while ensuring on-schedule delivery. Thus, the exemplary allocation of the budget for the May delivery period 610 among six order periods (December-May) is illustrated in FIG. 7A. Similarly, FIG. 7B illustrates the allocation of the budget for the June delivery period 620 among six order periods (January-June), and FIG. 7C illustrates the allocation of the budget for the July delivery period 630 among six order periods (February-July).

Figure 8:
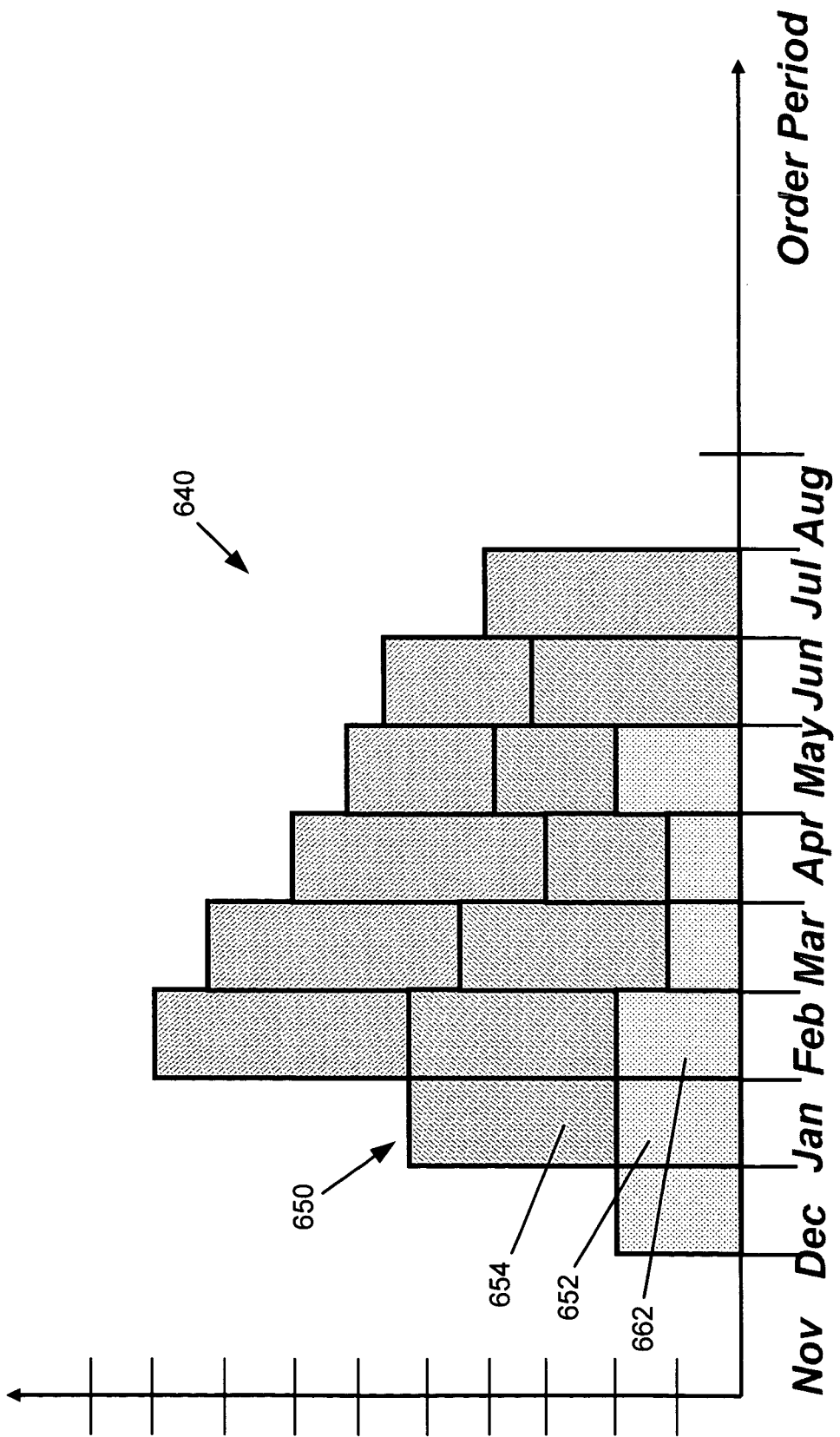
FIG. 8 is a chart illustrating a composite budget for the delivery periods of FIG. 6 allocated as shown in FIGS. 7A-C.

FIG. 8 is a composite illustration of the allocation of the budgets for the three delivery periods shown in FIG. 6. In this regard, a particular order period may include one or more budget portions corresponding to different delivery periods. For example, the order period of January 650 includes a budget portion 652 for the May delivery period and a budget portion 654 for the June delivery period. In some embodiments, the budget portions may be transferable from one delivery period to another. Thus, in the January order period 650, the budget portion 654 corresponding to the June delivery period may be transferred to the May delivery period if, for example, additional budget is required for the May delivery period to ensure on-schedule delivery of all goods. A balancing transfer may occur from the May delivery period to the June delivery period in future order periods, such as transferring the February budget portion 662 for the May delivery period to the June delivery period.

The budget allocation and the budget portions may be stored in any of a variety of forms. In one embodiment, the information is stored as a matrix or a table in a database. An example of the matrix illustrating the information in FIG. 8 is illustrated below in Table 1:

TABLE 1

| ORDER PERIOD | MAY DELIVERY | JUNE DELIVERY | JULY DELIVERY |
|---|---|---|---|
| December | US$20K | 0 | 0 |
| January | US$20K | US$30K | 0 |
| February | US$20K | US$30K | US$40K |
| March | US$10K | US$30K | US$40K |
| April | US$10K | US$20K | US$40K |
| May | US$20K | US$20K | US$20K |
| June | 0 | US$30K | US$20K |
| July | 0 | 0 | US$40K |

Figure 11:
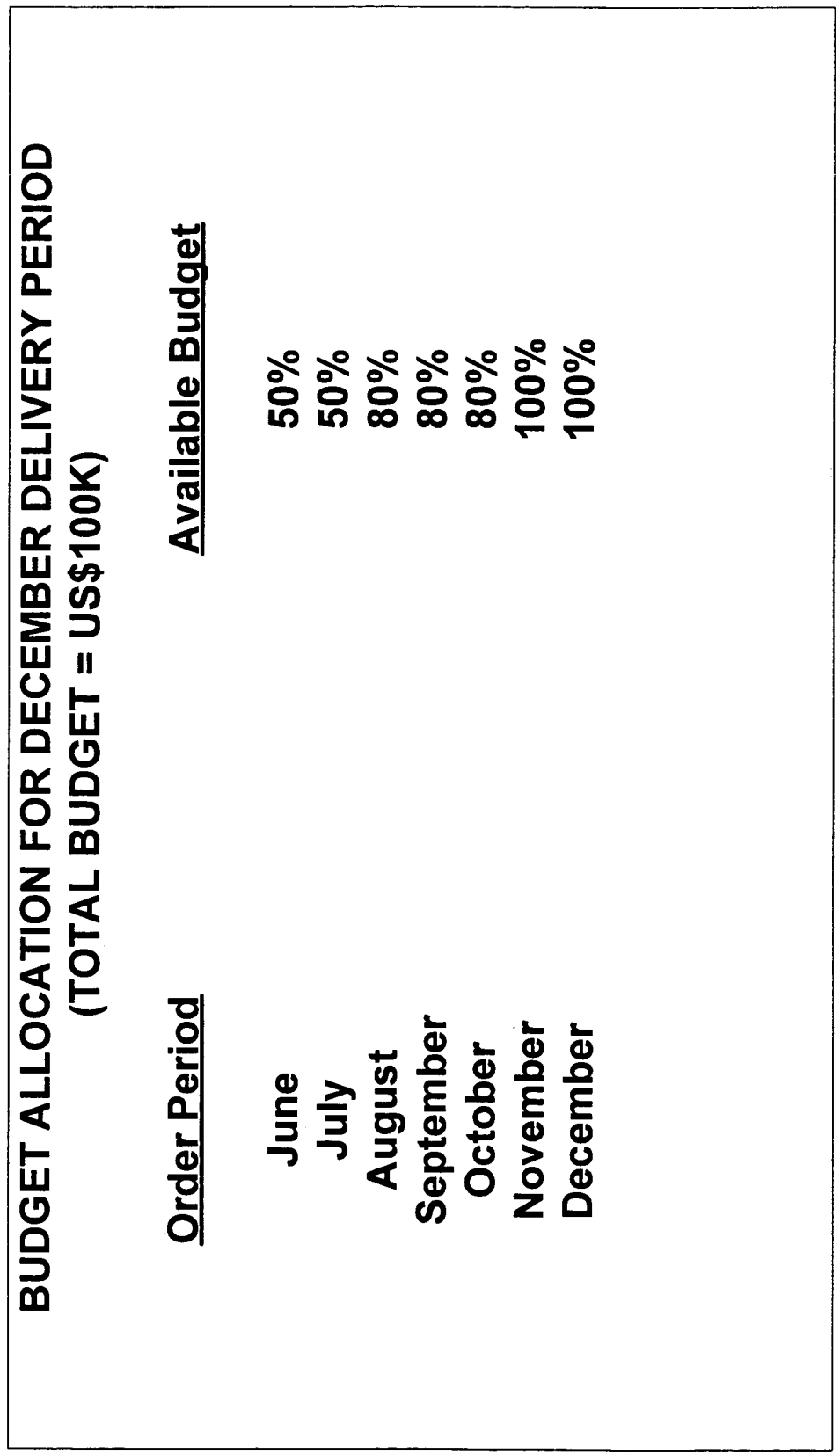
FIG. 11 illustrates another exemplary allocation of a budget for a delivery period.

FIG. 11 illustrates another exemplary allocation of a budget for a delivery period. In this exemplary allocation, the budget for a delivery period (December) is allocated to the several months preceding the delivery month. However, instead of allocating a certain amount of the budget for each month, a percentage of the budget is made available at selected points. Thus, in the illustrated example, the total budget for the December delivery period is US$100,000. Fifty percent of the budget, or US$50,000, is made available for the June order period. The available budget remains at the fifty-percent level through the July order period and is increased for the August order period to 80 percent, where it remains for the September and October order periods as well. Finally, for the November order period, the remainder of the budget for the December delivery period is released. Of course, other forms of allocation will be apparent to those skilled in the art and are contemplated within the scope of the invention.

The delivery periods and the order periods in the above exemplary embodiments correspond to calendar months. It will be understood by those skilled in the art that delivery periods and order periods may be implemented in various other units of measurement, such as years, seasons (e.g., fall, summer, Christmas), weeks, posting periods, etc. Additionally, it is not required that the delivery periods and the order periods correspond to same or similar units of measurement. For example, the delivery period may occur on a monthly basis, while order periods may occur on a weekly basis.

An embodiment of a method for processing a purchase order for a particular delivery period will now be described with reference to FIG. 9. The process 700 illustrates the processing of a purchase order during one of the plurality of order periods corresponding to a specific delivery period. At block 710, a purchase order for the current order period is received by the OTB system 210 of FIG. 2, for example. Once the order is received, the budget allocation for the specific delivery period may be retrieved or determined (block 712). The budget allocation may be predetermined and stored in, for example, the budget rules in the planned budget module 214 illustrated in FIG. 2. From retrieval of the budget allocation, a budget portion for the current order period may be determined.

In addition to the budget portion for the current order period, remaining budget from budget portions of previous order periods may also be determined. For example, with reference to FIG. 7A, if the current order period is February for the May delivery period, the budget portion for the current order period is US$20,000. Additionally, it may be possible that the budget portions for the December and January order periods were not completely exhausted on purchase orders processed for those periods. Thus, the available budget for the February order period is the sum of the budget portion of the current order period and any remaining budget, or overbooked budget due to a special release (negative amount), from prior order periods for the same delivery period.

This sum is then compared to the total cost of the purchase order received to determine whether sufficient budget is available to accommodate the purchase order (block 714). If sufficient budget is available, the purchase order may be processed without further conditions (block 716), and the process proceeds to block 722.

If a determination is made at block 714 that the sum of the budget portion of the current order period and any remaining budget from prior order periods is less than the total cost of the purchase order, the purchase order is rejected (block 718).

In certain embodiments, the acceptance or rejection of the purchase order may terminate the process 700. Further processing may require separate user operations.

Figure 9:
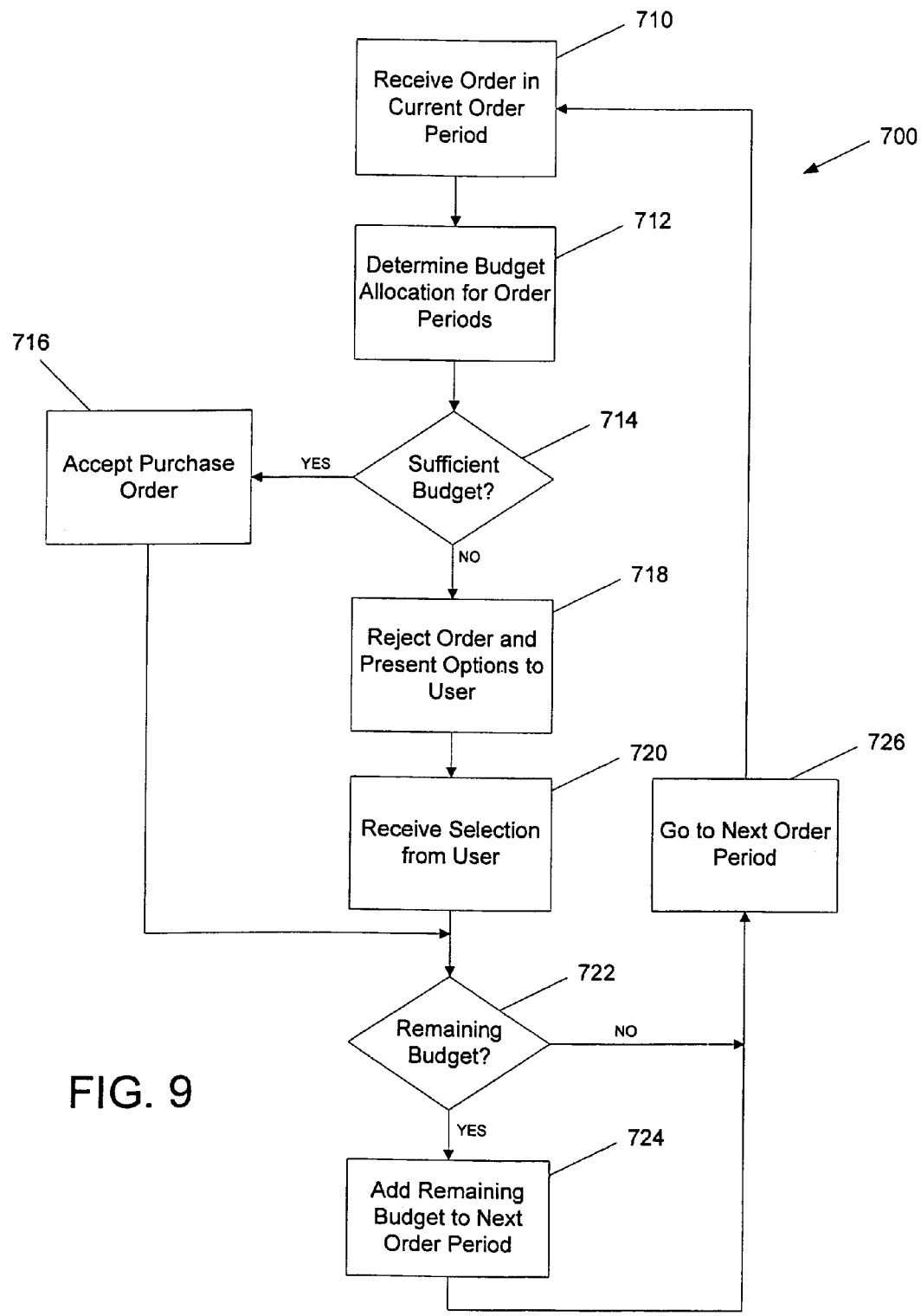
FIG. 9 is a flow chart illustrating an embodiment of a method of processing a purchase order for a delivery period.

In other embodiments, such as that illustrated in FIG. 9, the rejection of the order is accompanied by a display of one or more options to the user. One exemplary set of options is described below with reference to FIG. 10. The selection of an option by the user is received at block 720. As described in greater detail below, the selection of an option by the user may eliminate the purchase order or process the order with modifications to at least one of the order and the budget allocation.

At block 722, the process 700 determines whether any budget remains from the sum of the budget portion of the current order period and any remaining budget from prior order periods. If some budget remains, the remaining budget is carried forward to the next order period (block 724). The processing for the particular delivery period then proceeds to the next order period (block 726). This may be accomplished automatically without user interaction, as illustrated in the exemplary embodiment of the OTB system of FIG. 2.

Referring now to FIG. 10, an exemplary display to the user is illustrated in the form of a screen shot. When the purchase order submitted by the user cannot be accommodated by the available budget, as at block 718 of FIG. 9, the user may be presented with a set of options to resolve the budget constraint. In this regard, the user is presented with a set of options that are described in sufficient detail for the user to determine the corresponding action. Each option may be accompanied by a selection indicia, such as a box to be checked, to allow the user to select one of the available options.

The exemplary options illustrated in FIG. 10 will now be described:

Option 1: Eliminate Order.

The user may be provided with the option of eliminating the entire purchase order for the current order period. In this regard, the user may elect to wait until the next order period, thereby allowing the available budget (the sum) to increase sufficiently to accommodate more of the purchase order. Thus, the entire available budget in the current order period is carried forward to the next order period.

Option 2: Modify Order—Maximum Order Size.

The user may be elect to modify the order such that all or most of the available budget is used. In this regard, the user may be presented with an option to modify the purchase order to maximize the size of the order. For example, with reference to FIG. 7A, if the available budget for the February order period is US$20,000 and the purchase order includes US$8,000 for product A, US$6,000 for product B, US$8,000 for product C and US$4,000 for product D, the user may be presented with a modified order which eliminates product B. Thus, the maximum achievable order size is presented to the user.

Option 3: Modify Budget Allocation—Accommodate Order.

It may be possible for the user to modify the allocation of the budget for the delivery period to increase the budget portion for one order period and reduce it for another. This option may be made available only to certain users who have sufficient privileges. Thus, the user may be allowed to increase the budget portion for the current order period to accommodate the purchase order, while decreasing the budget portion for one or more other order periods of the same delivery period. In some embodiments, it may be possible to transfer budgets between different delivery periods, as described above with reference to FIG. 8.

Option 4: Modify Order—Minimum Order Size, Ensure Delivery Schedule.

In some cases, the primary desire of the user may be to delay binding of the funds as late as possible. In such cases, the user may elect an option which modifies the purchase order to include only those goods which must be included in the current order period to maintain on-schedule delivery. Referring again to the example described above with reference to OPTION 2, certain products may require inclusion in a February order period to be included in the May delivery period. If product B is such a product and if the ordering of products A, C and D can be delayed until at least the March order period, the user may elect an option which modifies the purchase order to include only product B.

Option 5: Modify Budget Allocation and Order—Minimum Order Size, Ensure Delivery Schedule.

In the example described above with reference to OPTION 4, product B could be accommodated within the available budget. There may be cases in which only some products require inclusion in the current order period, but the cost of those products exceeds the available budget. For example, with reference to FIG. 7A, with the available budget for the February order period at US$20,000, the purchase order may include US$8,000 for product A, US$10,000 for product B, US$12,000 for product C and US$4,000 for product D, with products B and C requiring inclusion in the February order period. In such as case, modification only of the order is insufficient, since the cost of the modified order (US$22,000) still exceeds the available budget (US$20,000). Thus, the budget allocation may also require modification, similarly to the modification described above with reference to OPTION 3.

FIG. 10 illustrates an exemplary set of five options. In certain embodiments, one or more of the displayed options may not be available and cannot be selected by the user. For example, of the options displayed in FIG. 10, Option 4 may not be available if there is insufficient budget available to ensure on-schedule delivery of all goods in the purchase order.

Thus, the disclosed system can accommodate processing of purchase orders having items with large variations in lead times without tying up, or binding funds at an early stage.

Further, by separating the available budget into budget portions, or buckets, corresponding to order periods, the disclosed system provides the capability of ensuring the availability of budget in the later order periods.

Many other changes and modifications may be made to the present invention without departing from the spirit thereof. The scope of these and other changes will become apparent from the appended claims.

What is claimed is:

1. A non-transitory computer-readable storage media for performing a method of processing a purchase order comprising machine-readable program code for causing one or more processors to perform the method, the method comprising:

receiving a first electronic purchase order for items to be purchased in a first order period for delivery in a first delivery period and a second delivery period;

receiving a second electronic purchase order for items to be purchased in a second order period for delivery in the second delivery period and a third delivery period;

accessing a budget allocation corresponding to at least the first delivery period and the second delivery period, the budget allocation including a first budget for the first order period and a second budget for the second order period, the first budget including budget funds for the first delivery period and the second delivery period, the second budget including budget funds for the second delivery period and the third delivery period;

calculating a cost of the first electronic purchase order;

applying budget rules to the first electronic purchase order to determine whether the first electronic purchase order may be submitted to a vendor to purchase the items, wherein applying the budget rules includes determining whether the cost is greater than a sum of the first budget for the first order period and any remaining budget from prior order periods of a plurality of order periods;

providing a rejection of the first electronic purchase order based at least partially on the cost of the first electronic purchase order exceeding the sum of the first budget for the first order period and any remaining budget from prior order periods of a plurality of order periods; and allowing a user to modify one or more of the budget rules based on the rejection of the first electronic purchase order.

2. The computer-readable storage media of claim 1, further comprising the step of providing an acceptance of the first electronic purchase order after the user modifies one or more of the budget rules.

3. The computer-readable storage media of claim 1, wherein providing the rejection is accompanied by providing one or more options to a user.

4. The computer-readable storage media of claim 3, wherein the options include an option to cancel the first electronic purchase order.

5. The computer-readable storage media of claim 3, wherein the options include an option to modify the first electronic purchase order to maximize a size of the first electronic purchase order while reducing the cost of the first electronic purchase order below the sum.

6. The computer-readable storage media of claim 3, wherein the options include an option to modify the first electronic purchase order to minimize a size of the first electronic purchase order while ensuring a desired delivery schedule.

7. The computer-readable storage media of claim 1, wherein the budget rules include the budget allocation.

8. The computer-readable storage media of claim 7, wherein the ability to modify budget rules includes modifying the budget allocation to accommodate the first electronic purchase order.

9. The computer-readable storage media of claim 7, wherein the ability to modify the budget allocation includes modifying the budget allocation to ensure a desired delivery schedule.

10. The computer-readable storage media of claim 9, further comprising an option to modify the first electronic purchase order.

11. The computer-readable storage media of claim 1, further comprising the step of determining if the user has an ability to modify the budget rules of increasing an amount of money available in at least one order period of the plurality of order periods for a designated delivery period.

12. The computer-readable storage media of claim 1, wherein the step of providing the user with the ability to modify one or more budget rules includes constraints.

13. The computer-readable storage media of claim 12, wherein the constraints in the step of providing the user with the ability to modify one or more budget rules include a requirement of a correlating change to the second order period of the plurality of order periods.

14. A program product embodied in non-transitory computer-readable media for purchase order processing, comprising machine-readable program code for causing, when executed, one or more machines to perform the following method steps:
receiving a first electronic purchase order for items to be purchased in a first order period for delivery in a first delivery period and a second delivery period;
receiving a second electronic purchase order for items to be purchased in a second order period for delivery in the second delivery period and a third delivery period;
accessing a budget allocation corresponding to at least the first delivery period and the second delivery period, the budget allocation including a first budget for the first order period and a second budget for the second order period, the first budget including budget funds for the first delivery period and the second delivery period, the second budget including budget funds for the second delivery period and the third delivery period;
calculating a cost of the first electronic purchase order;
applying budget rules to the first electronic purchase order to determine whether the first electronic purchase order may be submitted to a vendor to purchase the items, wherein applying the budget rules includes determining whether the cost is greater than a sum of the first budget for the first order period and any remaining budget from prior order periods of a plurality of order periods;
providing a rejection of the first electronic purchase order based at least partially on the cost of the first electronic purchase order exceeding the sum of the first budget for the first order period and any remaining budget from prior order periods of a plurality of order periods; and
allowing a user to modify one or more of the budget rules based on the rejection of the first electronic purchase order.

15. The program product of claim 14, further comprising the step of providing an acceptance of the first electronic purchase order after the user modifies one or more of the budget rules.

16. The program product of claim 14, wherein providing the rejection is accompanied by providing one or more options to a user.

17. The program product of claim 16, wherein the options include an option to cancel the first electronic purchase order.

18. The program product of claim 16, wherein the options include an option to modify the first electronic purchase order to maximize a size of the first electronic purchase order while reducing the cost of the first electronic purchase order below the sum.

19. The program product of claim 16, wherein the options include an option to modify the first electronic purchase order to minimize a size of the first electronic purchase order while ensuring a desired delivery schedule.

20. The program product of claim 14, wherein the budget rules include the budget allocation.

21. The program product of claim 20, wherein the ability to modify budget rules includes modifying the budget allocation to accommodate the first electronic purchase order.

22. The program product of claim 20, wherein the ability to modify the budget allocation includes modifying the budget allocation to ensure a desired delivery schedule.

23. The program product of claim 22, further comprising an option to modify the first electronic purchase order.

24. The program product of claim 14, further comprising the step of determining if the user has an ability to modify the budget rules of increasing an amount of money available in at least one order period of the plurality of order periods.

25. The program product of claim 14, wherein the step of providing the user with the ability to modify one or more budget rules includes constraints.

26. The program product of claim 25, wherein the constraints in the step of providing the user with the ability to modify one or more budget rules include a requirement of a correlating change to the second order period of the plurality of order periods for the designated delivery period.

27. Non-transitory machine readable media having stored therein instructions that, when executed, cause a processor to implement a method for purchase order processing, which comprises the steps of:
receiving a first electronic purchase order for items to be purchased in a first order period for delivery in a first delivery period and a second delivery period;
receiving a second electronic purchase order for items to be purchased in a second order period for delivery in the second delivery period and a third delivery period;
accessing a budget allocation corresponding to at least the first delivery period and the second delivery period, the budget allocation including a first budget for the first order period and a second budget for the second order period, the first budget including budget funds for the first delivery period and the second delivery period, the second budget including budget funds for the second delivery period and the third delivery period;
calculating a cost of the first electronic purchase order;
applying budget rules to the first electronic purchase order to determine whether the first electronic purchase order may be submitted to a vendor to purchase the items, wherein applying the budget rules includes determining whether the cost is greater than a sum of the first budget for the first order period and any remaining budget from prior order periods of a plurality of order periods;
providing a rejection of the first electronic purchase order based at least partially on the cost of the first electronic purchase order exceeding the sum of the first budget for the first order period and any remaining budget from prior order periods of a plurality of order periods;
providing a user with a reason for the rejection of the first electronic purchase order;

providing the user with one or more options to remedy the rejection based on the rejection of the first electronic purchase order, wherein the options include modifications to the first electronic purchase order and the budget rules;

allowing the user to modify one or more of the budget rules based on the rejection of the first electronic purchase order;

allowing the user to modify the first electronic purchase order based on the rejection of the first electronic purchase order;

applying the modified budget rules to the modified first electronic purchase order; and providing an acceptance of the modified first electronic purchase order based on the modified budget rules and modifications made to the first electronic purchase order.

28. The machine readable media according to claim 27, wherein the options include an option to modify the first electronic purchase order to minimize a size of the first electronic purchase order while ensuring a desired delivery schedule.

29. The machine readable media according to claim 27, wherein allowing the user to modify one or more of the budget rules includes modifying the budget allocation to accommodate the first electronic purchase order.

30. The machine readable media according to claim 27, wherein allowing the user to modify one or more of the budget rules includes increasing an amount of money available in the current one of the plurality of order periods for a designated delivery period.

* * * * *